(12) United States Patent
Yun et al.

(10) Patent No.: US 10,443,339 B2
(45) Date of Patent: Oct. 15, 2019

(54) ELASTOMERIC MATERIALS

(71) Applicant: Schlumberger Technology Corporation, Sugar Land, TX (US)

(72) Inventors: Jushik Yun, Sugar Land, TX (US); Xiaohong Ren, Sugar Land, TX (US); Manuel Marya, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 229 days.

(21) Appl. No.: 15/191,090

(22) Filed: Jun. 23, 2016

(65) Prior Publication Data
US 2017/0370174 A1 Dec. 28, 2017

(51) Int. Cl.
*C08K 3/04* (2006.01)
*E21B 33/12* (2006.01)
*C08J 5/00* (2006.01)
*B82Y 30/00* (2011.01)

(52) U.S. Cl.
CPC .......... *E21B 33/1208* (2013.01); *C08J 5/005* (2013.01); *C08K 3/04* (2013.01); *B82Y 30/00* (2013.01); *C08J 2300/26* (2013.01)

(58) Field of Classification Search
CPC ................... C08K 3/046; C08K 2201/011
See application file for complete search history.

(56) References Cited

U.S. PATENT DOCUMENTS

| 6,789,634 | B1 | 9/2004 | Denton | |
| 7,331,581 | B2 | 2/2008 | Xu et al. | |
| 7,363,970 | B2 | 4/2008 | Corre et al. | |
| 8,322,450 | B2 | 12/2012 | Meijer | |
| 8,501,858 | B2 | 8/2013 | Drzal et al. | |
| 8,866,479 | B2 * | 10/2014 | Groeppel | B82Y 30/00 324/318 |
| 9,399,829 | B2 * | 7/2016 | Hidrot | B29C 47/027 |
| 10,072,129 | B2 * | 9/2018 | Loomis | H05K 1/028 |
| 2006/0231792 | A1 | 10/2006 | Drzal et al. | |
| 2009/0036605 | A1 * | 2/2009 | Ver Meer | E21B 33/1208 525/55 |
| 2009/0294137 | A1 | 12/2009 | Meijer | |
| 2011/0315377 | A1 * | 12/2011 | Rioufol | E21B 47/01 166/250.17 |
| 2016/0217888 | A1 * | 7/2016 | Xiang | E21B 17/003 |

FOREIGN PATENT DOCUMENTS

| CN | 103408855 A | 11/2013 | |
| WO | WO2013058412 A1 | 4/2013 | |
| WO | WO-2015034974 A1 * | 3/2015 | ........... E21B 17/003 |

OTHER PUBLICATIONS

Drzal, Lawrence T., "Graphene Nanoplatelets: A Multi-functional Nanomaterial Additive for Polymers and Composites", XG Sciences (2012) 33 pages.

(Continued)

*Primary Examiner* — Kenneth L Thompson

(57) ABSTRACT

A bore tool can include a component that includes a longitudinal axis and a perimeter surface disposed at one or more radii from the longitudinal axis; and an elastomeric component disposed about the perimeter surface where the elastomeric component includes an elastomeric material that includes carbon-based nanoplatelets.

16 Claims, 18 Drawing Sheets

(56) References Cited

OTHER PUBLICATIONS

Wang et al, "Carboxyl-terminated butadiene-acrylonitrile-toughened epoxy/carboxyl-modified carbon nanotube nanocomposites: Thermal and mechanical properties", eXPRESS Polymer Letters vol. 6, No. 9 (2012) pp. 719-728.
Hummers, et al, "Preparation of graphitic oxide", Journal of the American Chemical Society, vol. 80, 1339.
Singh et al, "Development of oxidation and corrosion resistance hydrophobic graphene oxide-polymer composite coating on copper", Surface & Coatings Technology, 2013, 232, 475-481.
Zhou, et al, "Origin of the chemical and kinetic stability of graphene oxide", Scientific Reports, vol. 3, Art. 2484, Aug. 21, 2013, 7 pages.
Paulchamy, et al, "A Simple Approach to Stepwise Synthesis of Graphene Oxide Nanomaterial", J Nanomed Nanotechnol (2015) vol. 6, Issue 1; 4 pages.
Pasbakhsh et al., "In uence of maleic anhydride grafted ethylene propylene diene monomer (MAH-g-EPDM) on the properties of EPDM nanocomposites reinforced by halloysite nanotubes", Polymer Testing 28 (2009) pp. 548-559.
Li et al, "The Preparation of Graphene Oxide and Its Derivatives and Their Application in Bio-Tribological Systems", Lubricants (2014) pp. 137-161.
Geim et al, "The rise of graphene", Nature Materials, 2007, 6 (3) 183-191, Abstract, 1 page.
XG Sciences, About XGNP Graphene Nanoplatelets, http://xgsciences.com/products/graphene-nanoplatelets/, 2016, 1 page.
Kalaitzidou et al, "Multifunctional polypropylene composites produced by incorporation of exfoliated graphite nanoplatelets", Carbon, vol. 45, Issue 7, Jun. 2007, pp. 1446-1452, Abstract (1 page).
Kalaitzidou et al, "Mechanical properties and morphological characterization of exfoliated graphite-polypropylene nanocomposites", Composites Part A: Applied Science and Manufacturing, vol. 38, Issue 7, Jul. 2007, pp. 1675-1682, Abstract (1 page).
Kalaitzidou et al, "The nucleating effect of exfoliated graphite nanoplatelets and their influence on the crystal structure and electrical conductivity of polypropylene nanocomposites", J. Mater. Sci., 43, 2895-2907 (2008), Abstract (1 page).
Jiang et al, "Multifunctional high density polyethylene nanocomposites produced by incorporation of exfoliated graphite nanoplatelets 1: Morphology and mechanical properties", Polymer Composites, vol. 31, Issue 6, pp. 1091-1098, Jun. 2010, Abstract (1 page).
Kim et al, "Improvement of electric conductivity of LLDPE based nanocomposite by paraffin coating on exfoliated graphite nanoplatelets", Composites Part A: Applied Science and Manufacturing, vol. 41, Issue 5, May 2010, pp. 581-587, Abstract (1 page).
Liu et al, "Influence of Processing on Morphology, Electrical Conductivity and Flexural Properties of Exfoliated Graphite Nanoplatelets—Polyamide Nanocomposites", Carbon Lett., vol. 11, No. 4 Dec. 2010 pp. 279-284 (6 pages).
Via et al, "Electrical conductivity modeling of carbon black/polycarbonate, carbon nanotube/polycarbonate, and exfoliated graphite nanoplatelet/polycarbonate composites", Journal of Applied Polymer Science vol. 124, Issue 1, pp. 182-189, Apr. 5, 2012, Abstract (1 page).
Paddock, Lee "A New Environmental Accountability System for the Nanotechnology Industry", NSTI-Nanotech 2006, www.nsti.org, ISBN 0-9767985-6-5 vol. 1, 2006 (4 pages).
Patsidis et al, "Dielectric response, functionality and energy storage in epoxy nanocomposites: Barium titanate vs exfoliated graphite nanoplatelets", Materials Chemistry and Physics, vol. 135, Issues 2-3, Aug. 15, 2012, pp. 798-805, Abstract (1 page).
Potts et al," Processing-Morphology-Property Relationships and Composite Theory Analysis of Reduced Graphene Oxide/Natural Rubber Nanocomposites", Macromolecules, 45, 6045-6055, 2012, Abstract (1 page).
Zhan et al, "Dispersion and Exfoliation of Graphene in Rubber by an Ultrasonically-Assisted Latex Mixing and in situ Reduction Process", Macromol. Mater. Eng., 296: 590-602, Abstract (2 pages).
Kuilla et al, "Recent advances in graphene based polymer composites", Progress in polymer science, 35 (2010) 1350-1375 (26 pages).
Ozbas et al., "Strain-Induced Crystallization and Mechanical Properties of Functionalized Graphene Sheet-Filled Natural Rubber", J. of Polymer science Part B: Polymer Physics 2012, 50, 718-723 (6 pages).

\* cited by examiner

Method 710

Graphite
720

Graphite Oxide
740

Graphene Oxide (GO)
760

ELASTOMERIC MATERIALS

BACKGROUND

Equipment used in the oil and gas industry may be exposed to high-temperature and/or high-pressure environments. Such environments may also be chemically harsh, for example, consider environments that may include chemicals such as hydrogen sulfide, carbon dioxide, etc. Various types of environmental conditions can damage equipment.

SUMMARY

A bore tool can include a component that includes a longitudinal axis and a perimeter surface disposed at one or more radii from the longitudinal axis; and an elastomeric component disposed about the perimeter surface where the elastomeric component includes an elastomeric material that includes carbon-based nanoplatelets. A method can include forming an elastomeric component that includes carbon-based nanoplatelets in an elastomeric matrix; fitting the elastomeric component about a perimeter surface of a tool that includes a longitudinal axis; and tripping the tool into a bore in a geologic formation. A bore packer assembly can include a first end elastomeric element; an intermediate elastomeric element; and a second end elastomeric element where at least one of the elastomeric elements includes carbon-based nanoparticles. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
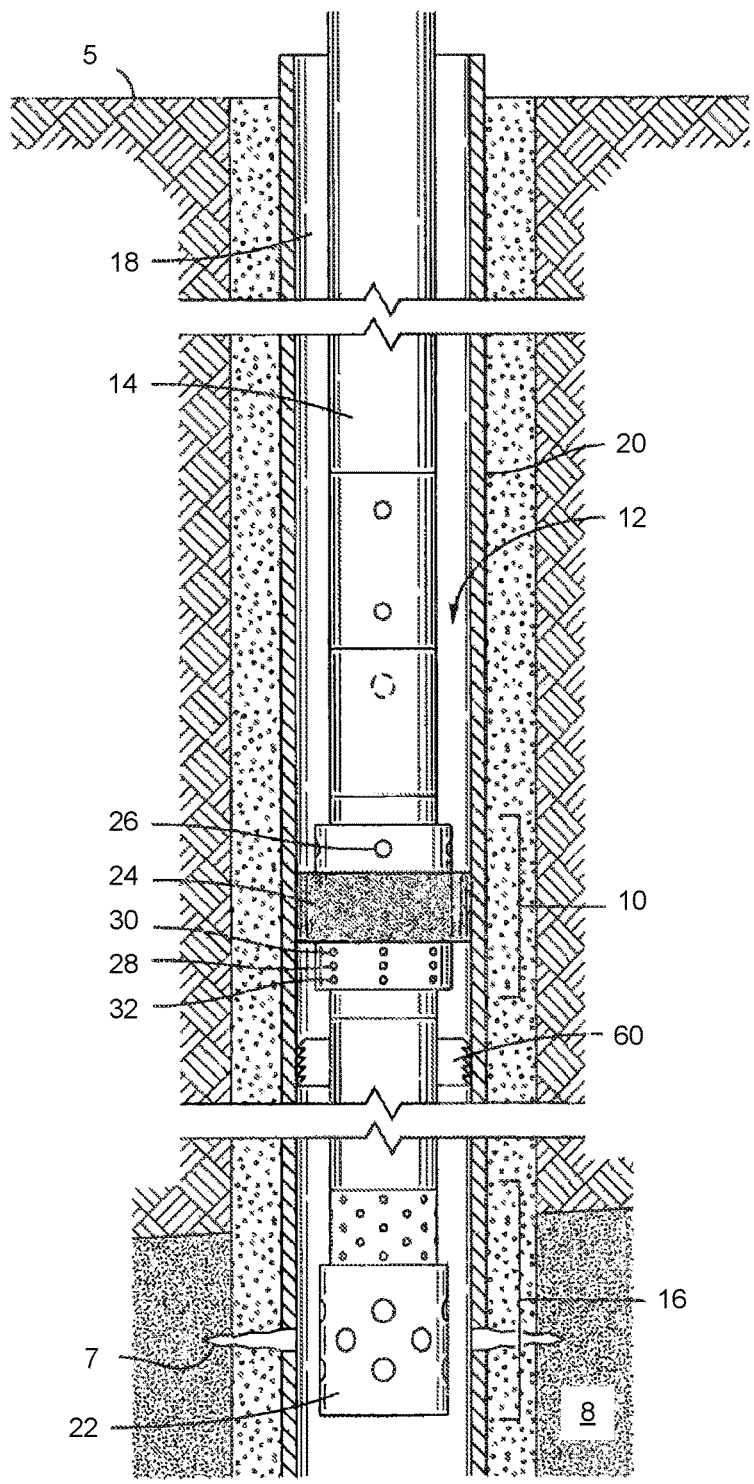
FIG. 1 illustrates examples of equipment in a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

An elastomeric material can include one or more types of polymers that can be characterized by viscoelasticity (e.g., viscosity and elasticity) that results in a relatively low Young's modulus (E) and a relatively high failure strain in comparison with non-elastomeric materials. As an example, an elastomeric material or elastomer may include or be rubber, which can be a vulcanisate. As an example, monomers that link to form polymers can include carbon and hydrogen and, for example, oxygen and/or silicon. Elastomers tend to be amorphous polymers existing above their glass transition temperature, which can allow for segmental motion. At ambient temperatures, rubbers tend to be relatively soft (e.g., E of the order of about 3 MPa) and deformable.

Elastomers that exist without reinforcing material (e.g., reinforcement) can be limited for use in high-performance applications as their strength may be about ten times lower than in a reinforced state (e.g., as an elastomeric material that includes one or more elastomers and one or more other types of material).

As an example, a reinforcing material can include silica or carbon-black. Such reinforcing materials find use as fillers in elastomeric materials, which may be used to form elastomeric seals (e.g., packers, plugs, misc. seals, etc.).

Packer elastomers can lose mechanical properties as temperature increases. For example, mechanical properties of hydrogenated nitrile butadiene rubber (HNBR) can be decreased at temperatures of about 160 degrees C. (e.g., about 325 degrees F.) and mechanical properties of AFLAS™ fluororubber (Asahi Glass Co., Ltd., Tokyo, Japan) can be decreased at temperatures of about 220 degrees C. (e.g., about 425 degrees F.).

As an example, an elastomeric component may be formed via mixing one or more elastomers (e.g., in polymer and/or monomer forms) together with one or more types of fillers as reinforcements. As an example, a method for forming an elastomeric component or components may include curing (e.g., polymerization, cross-linking, etc.). As an example, an elastomeric component can be formed according to a mechanical design. For example, consider an arrangement of components that can include one or more elastomeric components and optionally one or more non-elastomeric components (e.g., metal, hard plastic, ceramic, etc.).

As an example, a method can include additional of one or more reinforcements, mixing, processing to form one or more elastomeric components. As an example, a method can include adding one or more types of nanoscale reinforcements. For example, consider nanoscale particulate material that may be referred to as nanoparticles, noting that a nanoscale particulate material can include one or more dimensions that may be greater than nanoscale (e.g., consider nanofibers, nanoplates, etc.). As an example, nanoparticles may be particles that include a dimension or dimensions in a range from about 1 to about 100 nanometers. As an example, in nanotechnology, a particle may be defined as a small object that behaves as a unit with respect to its transport and properties. As an example, particles may be classified according to a dimension such as diameter and/or, for example, a maximum dimension and a minimum dimension. As an example, ultrafine particles can be particles that include a dimension (e.g., diameter) in a range of about 1 to about 100 nanometers; whereas, fine particles may be larger (e.g., in a range of about 100 to about 2,500 nanometers).

As an example, an elastomeric material may be utilized as part of a packer. As an example, a packer can be a device or part of a device, an assembly, a system, etc., that can be run into a bore where the packer includes an initial outside dimension (e.g., diameter, radius, etc.) that can be expanded, for example, to form a seal (e.g., with the bore). In such an example, a bore may be a bore of tubing, casing, etc. or, for example, a bore may be an earthen bore (e.g., a rock formation bore, etc.).

As an example, a packer can employ one or more elastomeric components (e.g., elastomeric elements) that can be expanded. For example, consider a production or test packer and an inflatable packer. As to a production or test packer, expansion may be accomplished by squeezing one or more elastomeric elements, which may be somewhat doughnut shaped, between plates to thereby force the one or more elastomeric elements to bulge (e.g., outwardly). As to an inflatable packer, expansion may be accomplished by pumping a fluid into a bladder where fluid pressure causes the packer to expand. As an example, a production or test packer may be set in a cased hole and an inflatable packer may be used in an open hole or a cased hole. As an example, a packer may be run on wireline, pipe and/or coiled tubing. As an example, a packer may be designed to be removable and/or may be designed to be permanent. As an example, a permanent packer may be constructed of one or more materials that can be drilled and/or milled out.

As an example, a packer can be a downhole device that can be used in a completion to isolate an annulus from production conduit, which may allow for enabling controlled production, injection and/or treatment. As an example, a packer assembly can include a securing mechanism that can secure the packer against a casing and/or a liner wall. For example, consider a slip arrangement and a mechanism that can create a reliable hydraulic seal to isolate an annulus, for example, via an expandable elastomeric element. As an example, a packer may be classified by one or more types of applications of use, one or more setting methods and/or retrievability and/or permanence.

As an example, an elastomeric material may be utilized to form a packer or one or more other types of elastomeric components. As an example, such a component or components may be formulated with one or more reinforcing materials to raise one or more operational limits when compared to elastomers without such one or more reinforcing materials (e.g., NBR, HNBR, AFLAS™ fluororubber, EPDM (e.g., Ethylene-Propylene-Diene-Monomer rubber), etc.). As an example, an elastomeric material may provide for use in a greater $H_2S$ concentration environment.

As an example, a packer can be or include an elastomeric ring that may be expanded radially in one or more of various manners such as, for example, via mechanical manipulation (e.g., rotation, etc.), inflation, compression, etc. As an example, force to compress an elastomeric ring may be provided by hydraulic pressure, weight and/or other mechanism. As an example, a wellbore operation being performed may dictate a type of packer to be utilized (e.g., inflatable, hydraulically set, weight set, etc.) and may dictate whether a packer is to be retrievable or permanent.

As an example, one or more packers may be utilized in a wellbore testing operation such as, for example, a drillstem testing operation ("DST"). For example, for the purpose of measuring a characteristic of a well (e.g., formation pressure, flow rates, etc.) of a subterranean formation, a tubular test string may be dispose in a wellbore that extends into the formation. To test a particular region, or zone, of the formation the test string may include a perforating gun that is used to form perforation tunnels, or fractures, in portions of the formation surrounding the wellbore, optionally via perforations through casing. In such an example, to isolate a test zone (e.g., from a surface of the well), the test string may carry a packer to be set at the desired location in the well.

As an example, a geologic environment or downhole environment may be a harsh environment and/or an environment that may be classified as being a high-pressure and high-temperature environment. A so-called HPHT environment may include pressures up to about 138 MPa (e.g., about 20,000 psi) and temperatures up to about 205 degrees C. (e.g., about 400 degrees F.), a so-called ultra-HPHT environment may include pressures up to about 241 MPa (e.g., about 35,000 psi) and temperatures up to about 260 degrees C. (e.g., about 500 degrees F.) and a so-called HPHT-hc environment may include pressures greater than about 241 MPa (e.g., about 35,000 psi) and temperatures greater than about 260 degrees C. (e.g., about 500 degrees F.). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more).

As an example, an environment may be classified based at least in part on its chemical composition. For example, where an environment includes hydrogen sulfide ($H_2S$), carbon dioxide ($CO_2$), etc., the environment may be corrosive to certain materials. As an example, an environment may be classified based at least in part on particulate matter that may be in a fluid (e.g., suspended, entrained, etc.). As an example, particulate matter in an environment may be abrasive or otherwise damaging to equipment. As an example, matter may be soluble or insoluble in an environment and, for example, soluble in one environment and substantially insoluble in another.

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over a substantial period of time, uncertainty may arise in one or more factors that could impact integrity or expected lifetime of the equipment. As an example, where a period of time may be of the order of decades, equipment that is intended to last for such a period of time can be constructed with materials that may be expected to endure environmental conditions imposed thereon, whether imposed by an environment or environments and/or one or more functions of the equipment itself.

FIG. 1 is a schematic view of a packer assembly 10 that includes one or more packers disposed in a bore 12 of a geologic environment. In such an example, the packer assembly may be referred to as a bore packer assembly, which may be a type of bore tool (e.g., suitable for use in a bore formed in a geologic environment). In the example of FIG. 1, the packer assembly 10 is being utilized in well testing operation (e.g., drillstem testing). As an example, the packer assembly 10 may be a hydraulically set, retrievable packer that may be run downhole with a tubing, or test string 14, and set (e.g., to form a test zone 16) by applying hydraulic pressure via an annulus 18.

As an example, a packer assembly such as the packer assembly 10 may be placed in different configurations such as, for example, a run-in-hole configuration, a set configuration, and a pull-out-of-hole configuration. For example, the packer assembly 10 can be placed in a run-in-hole configuration before being lowered into bore 12 on a conveyance, such as test string 14. Once the packer assembly 10 is in a desired position in the bore 12, pressure can be transmitted via fluid present in the annulus 18 to place the packer assembly 10 in a set configuration in which one or more packers of the packer assembly 10 secure (e.g., anchor) themselves to a well casing 20 for isolating (e.g., sealing off) the test zone 16 across the annulus 18. In such an example, this permits the test string 14 to move through the packer assembly 10 while maintaining a seal between the interior of the one or more packers of the packer assembly 10 and an exterior of the test string 14. In the example of FIG. 1, after testing is complete, an upward force may be applied to the test string 14 to place the packer assembly 10 in a pull-out-of-hole configuration to disengage the one or more packers of the packer assembly 10 from the casing 20.

As an example, the packer assembly 10 and the test string 14 may be allowed to linearly expand and contract without implementation of one or more slip joints. As the test string 14 is run downhole with the packer assembly 10, seals between the test string 14 and the packer assembly 10 may remain protected as the packer assembly 10 is lowered into and/or retrieved from the bore 12. In the example of FIG. 1, a perforating gun 22 can be operatively coupled to the packer assembly 10, for example, to create a perforation tunnel 7 through the casing 20 and into portions of the subterranean formation 8. As an example, one or more other tools may be included with the packer assembly 10, for example, in addition to or replacing the perforating gun 22.

As shown in the example of FIG. 1, the packer assembly 10 includes a packer in the form of an annular, resilient elastomeric seal element 24 that can be utilized to form an annular seal between the exterior of the packer assembly 10 and the interior of the casing 20 (e.g., in the set configuration of the packer assembly 10). In such an example, the packer assembly 10 can be configured to convert pressure exerted by fluid in the annulus 18 into a force to anchor the packer assembly 10 with the casing 20 and to compress the seal element 24. Such pressure may be a combination of the hydrostatic pressure of a column of fluid in the annulus 18 and, for example, pressure that is applied from the surface 5 (e.g., pumped, etc.) via the annulus 18.

As an example, the packer assembly 10 can be structured to transfer axial force (e.g., hydraulic force, etc.) across the packer assembly 10, for example, to set slips 60 bypassing the intervening elastomeric seal element 24 until the slips 60 are set (e.g., engaging the casing 20). As an example, when compressed, the seal element 24 can expand radially outward and form an annular seal with the interior of the casing 20. As an example, the packer assembly 10 can be constructed to hold the seal element 24 in a compressed state until the packer assembly 10 is placed in a pull-out-of-hole configuration, a configuration in which the packer assembly 10 releases compressive forces on the seal element 24 and allows the seal element 24 to assume a relaxed position.

In the example of FIG. 1, as an outer diameter of the seal element 24, in the uncompressed state, may be closely matched to an inner diameter of the casing 20, there may be a small annular clearance between the seal element 24 and the casing 20 as the packer assembly 10 is being retrieved from or lowered into the bore 12. As an example, to circumvent forces present as a result of a small annular clearance, the packer assembly 10 may permit fluid to flow through the packer assembly 10 (e.g., fluid bypass) when the packer assembly 10 is being lowered into or retrieved from the bore 12. As an example, the packer assembly 10 may include one or more radial bypass ports 26 that may be located above the seal element 24.

As an example, in a run-in-hole configuration, the packer assembly 10 can be constructed to establish fluid communication between one or more radial bypass ports 28 located below the seal element 24 and one or more of the one or more radial ports 26. As an example, in a pull-out-of-hole configuration, the packer assembly 10 can be constructed to establish fluid communication between one or more other radial ports 30, which may be located below the seal element 24, and one or more of the one or more radial ports 26. As an example, the one or more radial ports 26 above the seal element 24 may remain in an open state. However, when the packer assembly 10 is set, the radial ports 30 and 28 can be in a closed state. As an example, the packer assembly 10 can include one or more radial ports 32 that may be used, for example, to inject a kill fluid to halt production from a producing formation. As shown, the one or more ports 32 can be located below the seal element 24 in a lower housing 42 where each port may be a part of a bypass valve.

Figure 2:
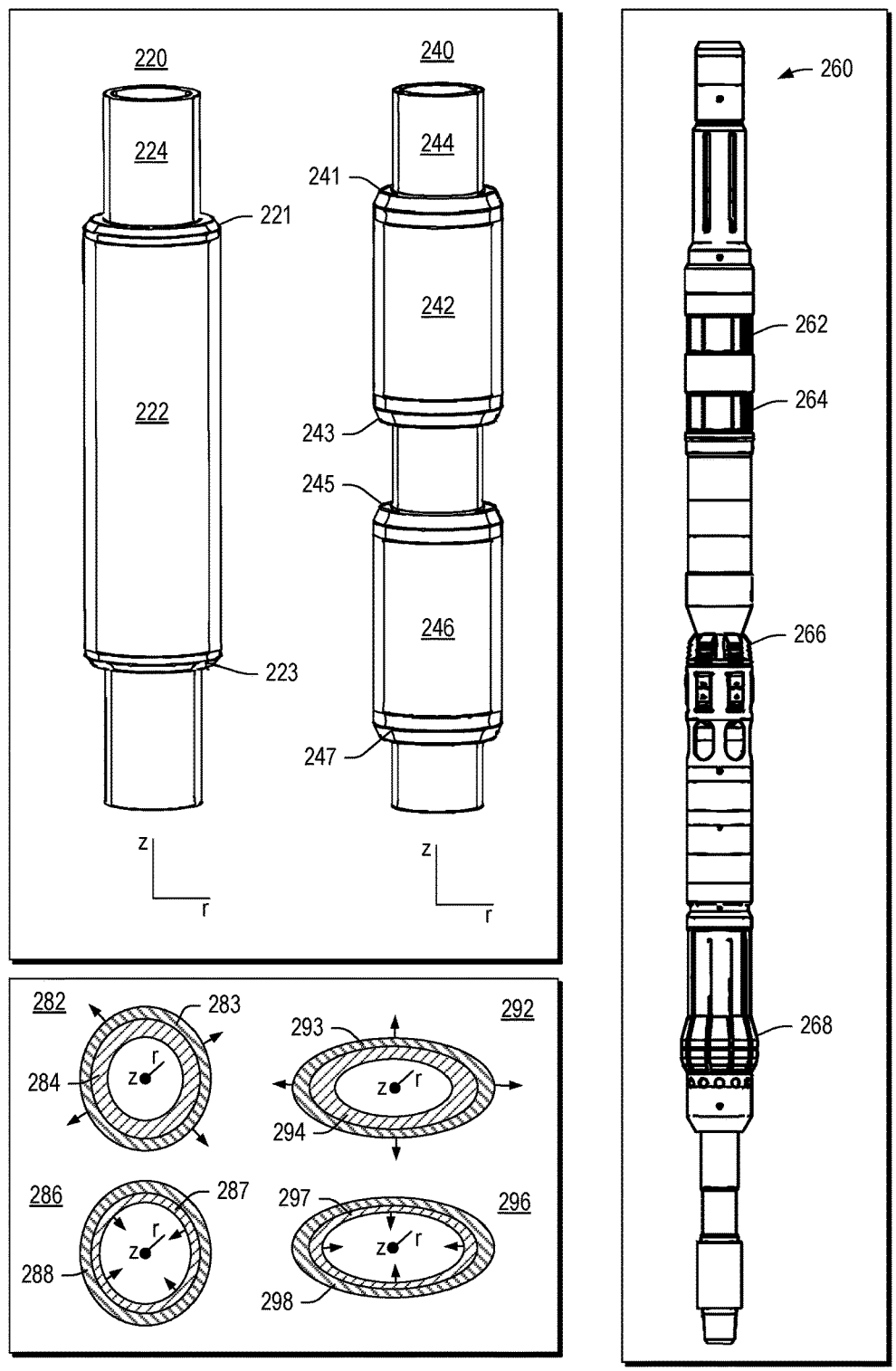
FIG. 2 illustrates examples of equipment.

FIG. 2 shows an example of a packer assembly 220 that includes rings 221 and 223 disposed at ends of a packer 222 disposed about a tube 224, an example of a packer assembly 240 that includes rings 241 and 243 disposed at ends of a first packer 242 and rings 245 and 247 disposed at ends of a second packer 246 where the first and second packers 242 and 246 and the rings 241, 243, 245 and 247 are disposed about a tube 244, an example of a multistage packer string 260 that includes packers 262 and 264, slips 266 and a drag block 268 and examples of components of bore tools and elastomeric components. As shown in the examples of FIG. 2, equipment that includes a tube or tubular portion can include one or more packers. Such equipment may include one or more other portions, for example, with slips, grips, etc.

As shown in FIG. 2, a packer can include rings, which may be, for example, constructed at least in part from an elastomeric material. As an example, rings can be seal rings that act to maintain seals while a packer is in an expanded state and, for example, in contact forcibly with a surface of a bore, which may be an equipment bore (e.g., a casing bore, etc.) or an earthen bore (e.g., a bore formed by a bore wall of a rock formation).

FIG. 2 shows an example of an assembly 282 that includes an elastomeric component 283 disposed about an outer perimeter surface of a component 284 of a bore tool that includes a longitudinal axis (z) where the elastomeric component 283 may be expanded and/or contracted in a radial direction as indicated by arrows, for example, to alter an outer perimeter of the elastomeric component 283 (e.g., an outer perimeter surface), optionally at least in part via altering a length of the elastomeric component 283. In such an example, an inner perimeter of the elastomeric component 283 may remain relatively constant and, for example, in contact with the outer perimeter surface of the component 284.

FIG. 2 shows an example of an assembly 286 that includes an elastomeric component 287 disposed about an inner perimeter surface of a component 288 of a bore tool that includes a longitudinal axis (z) where the elastomeric component 287 may be expanded and/or contracted in a radial direction as indicated by arrows, for example, to alter an inner perimeter of the elastomeric component 287 (e.g., an inner perimeter surface), optionally at least in part via altering a length of the elastomeric component 287. In such an example, an outer perimeter of the elastomeric component 287 may remain relatively constant and, for example, in contact with the inner perimeter surface of the component 288.

FIG. 2 shows an example of an assembly 292 that includes an elastomeric component 293 disposed about an outer perimeter surface of a component 294 of a bore tool that includes a longitudinal axis (z) where the elastomeric component 293 may be expanded and/or contracted in a radial direction as indicated by arrows, for example, to alter an outer perimeter of the elastomeric component 293 (e.g., an outer perimeter surface), optionally at least in part via altering a length of the elastomeric component 293. In such an example, an inner perimeter of the elastomeric component 293 may remain relatively constant and, for example, in contact with the outer perimeter surface of the component 294.

FIG. 2 shows an example of an assembly 296 that includes an elastomeric component 297 disposed about an inner perimeter surface of a component 298 of a bore tool that includes a longitudinal axis (z) where the elastomeric component 297 may be expanded and/or contracted in a radial direction as indicated by arrows, for example, to alter an inner perimeter of the elastomeric component 297 (e.g., an inner perimeter surface), optionally at least in part via altering a length of the elastomeric component 297. In such an example, an outer perimeter of the elastomeric component 297 may remain relatively constant and, for example, in contact with the inner perimeter surface of the component 298.

As an example, a bore tool can include a component that includes a longitudinal axis and a perimeter surface disposed at one or more radii from the longitudinal axis; and an elastomeric component disposed about the perimeter surface where the elastomeric component includes an elastomeric material that includes, for example, carbon-based nanoplatelets. In such an example, the perimeter surface of the component of the bore tool may be an outer perimeter surface or an inner perimeter surface. As an example, as to one or more radii, consider a substantially cylindrical component that includes an outer perimeter disposed at a substantially constant radius with respect to azimuthal angle about a longitudinal axis and/or an inner perimeter disposed at a substantially constant radius with respect to azimuthal angle about a longitudinal axis (see, e.g., the assemblies 282 and 286); or, for example, a component that may include an outer perimeter defined by more than one radius and/or an inner perimeter defined by more than one radius (see, e.g., the assemblies 292 and 296).

A method can include forming an elastomeric component that includes carbon-based nanoplatelets in an elastomeric matrix; fitting the elastomeric component about a perimeter surface of a tool that includes a longitudinal axis; and tripping the tool into a bore in a geologic formation. In such an example, the perimeter surface of the tool may be an inner perimeter surface or an outer perimeter surface. As an example, such a tool may be a bore tool as it is suitable for tripping into a bore in a geologic formation (e.g., geologic environment).

As an example, a bore packer assembly can include a first end elastomeric element; an intermediate elastomeric element; and a second end elastomeric element where at least one of the elastomeric elements includes carbon-based nanoparticles. In such an example, the bore packer assembly can include an outer perimeter surface where the elastomeric elements are disposed about the outer perimeter surface. As an example, one or more mechanisms may apply force to the elastomeric elements such that outer perimeters of the elastomeric elements change, for example, become greater or lesser depending on the direction of the force. As an example, where force acts to decrease the length of the elastomeric elements, the outer perimeters of the elastomeric elements can increase radially outwardly; whereas, where force acts to increase the length of the elastomeric elements, the outer perimeters of the elastomeric elements can decrease radially inwardly.

Figure 3:
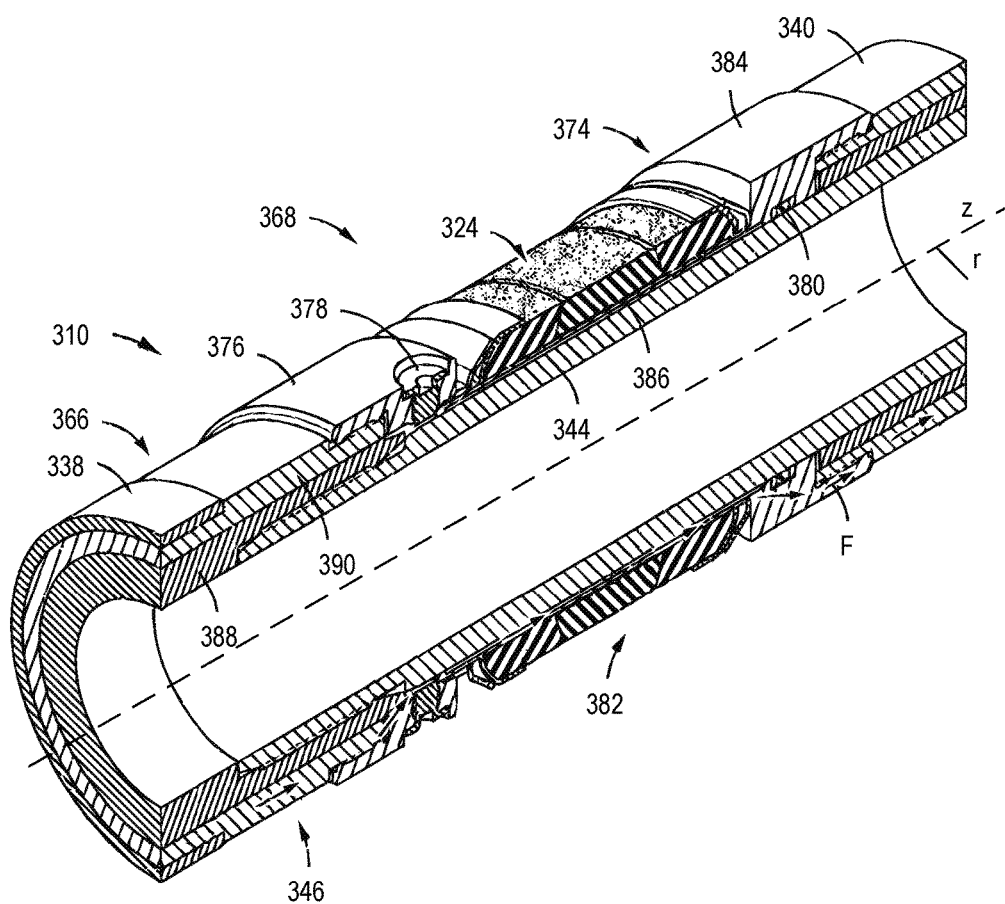
FIG. 3 illustrates an example of equipment.

FIG. 3 shows a cutaway view of a sealing element mechanism 368 of a packer 310. In the example of FIG. 3, the sealing element mechanism 368 includes an assembly 382 (e.g., a sliding shoe assembly) that includes a seal element 324, a sliding shoe (e.g., a sleeve) 374, a sliding shoe gage ring 376, a sliding shoe shear member (e.g., a pin) 378, and a sliding shoe seal member 380.

As shown in the example of FIG. 3, the seal element 324 can be a double fold back element stack, which can include a plurality of elastomeric (e.g., rubber) packer elements (e.g., elastomeric components). The seal element 324 can be connected to and can be moveable with the sliding shoe 374, which can include a head portion 384 and an elongated shelf 386. As shown in the example of FIG. 3, the sliding shoe 374 substantially circumscribes a packer mandrel 344.

In the example of FIG. 3, the seal element 324 can be operationally connected with shelf 386. As an example, a head portion 384 of the sliding shoe 374 can be oriented toward slips, for example, when the sliding shoe 374 is disposed on the mandrel 344. As shown, a gage ring 376 can be connected with the sliding shoe 374 via a shear member 378 and the gage ring 376 can be connected to shelf 386 of shoe 374 distal from the head portion 384, where the seal element 324 is disposed at least in part axially between the gage ring 376 and head portion 384 of the shoe 374. As an example, the assembled sliding shoe assembly 382 may be positioned on the packer mandrel 344. The sliding shoe assembly 382 can be operatively coupled to the ratchet mechanism 346 and a middle housing 340 (e.g., a pickup housing). In the example of FIG. 3, the head portion 384 of the sliding shoe 374 forms a box end which is threadedly coupled to the middle housing 340. As an example, an upper ratchet mandrel 388 may be threadedly coupled to a pin end of the packer mandrel 344 and, for example, an outer ratchet portion 390 may be disposed with an upper ratchet mandrel 388 (e.g., operatively coupled via threading to the gage ring 376).

As an example, a mechanism such as a sliding shoe assembly (see, e.g., the sliding shoe assembly 382) can provide for transferring axial force (see, e.g., "F" and arrows) from a setting mechanism (see, e.g., the setting mechanism 366) to slips around (e.g., bypassing, the seal element 324) a packer to set (e.g., actuate) the slips and, for example, anchor an assembly to casing and, for example, to then facilitate application of axial force to packer(s) (see, e.g., the seal elements 324) to compress and set the packer (s). As an example, axial force transfer across a setting mechanism (e.g., a housing) bypassing a packer can facilitate setting slips through a packer, for example, without setting or prematurely setting the packer until after the slip is set (e.g., delaying the setting of the seal element). Such a mechanism of force transfer can reduce loss of energy in axial force that occurs when acting through one or more packers (e.g., elastomeric components) and thereby facilitate achieving a setting force as desired at slips and minimizing an amount of actuating force at a setting mechanism and/or at a wellbore annulus.

Figure 4:
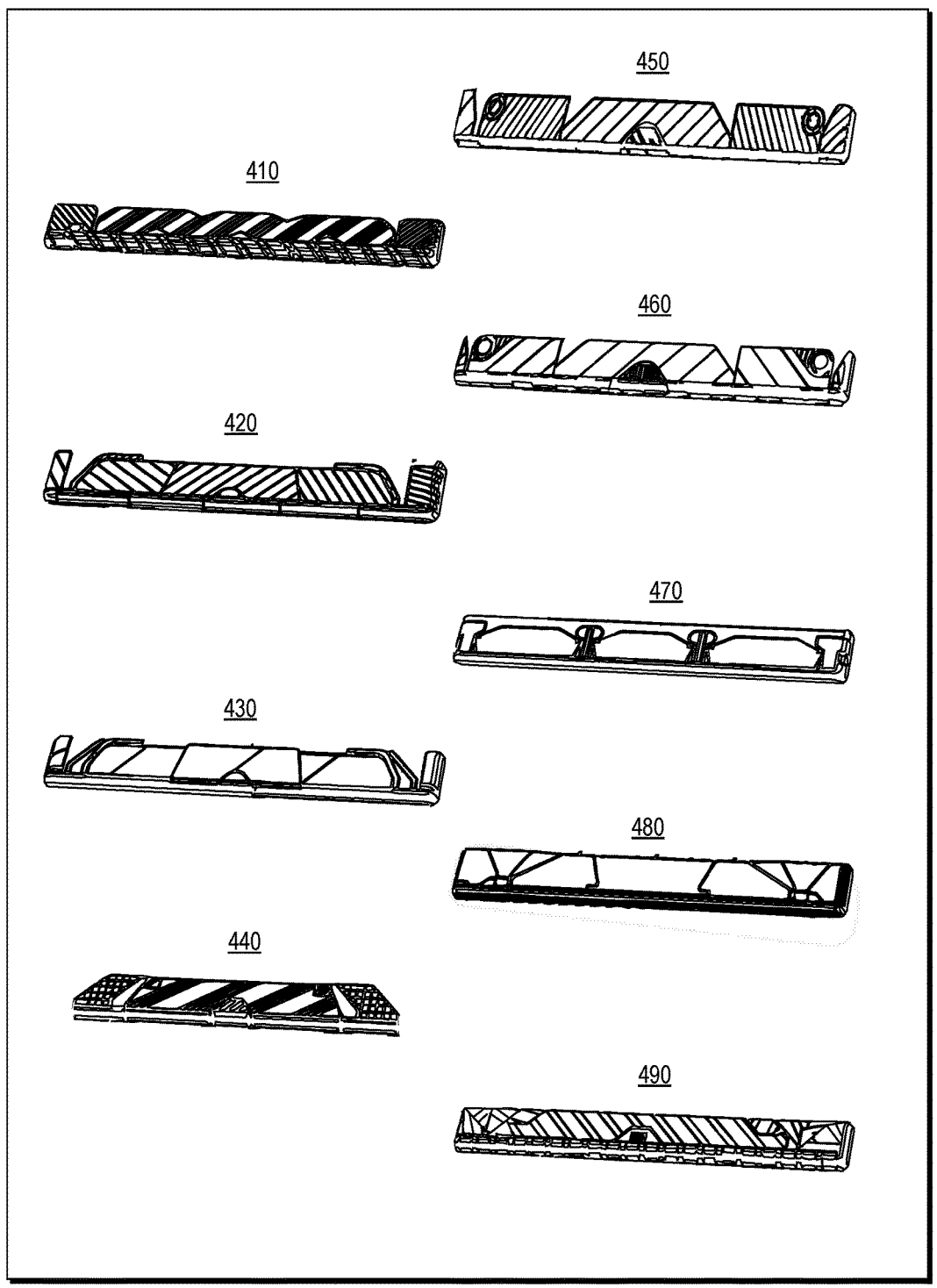
FIG. 4 illustrates examples of a packer assemblies.

FIG. 4 shows various examples of some types of packers, including a one piece packer 410, a fold back shoe packer 420, a dual fold back shoe packer 430, an ECNER array packer 440, a garter spring packer 450, a garter spring with wire mesh packer 460, a three piece packer 470, a soft set array packer 480 and an expandable ring packer 490. As an example, a packer can include an elastomeric material or elastomeric materials. As an example, a packer can include one or more metallic components (e.g., metal or alloy). As an example, a packer can include one or more rings, which may include a metal ring and/or an alloy ring. As an example, a packer can include a mesh or meshes, which may include a metal mesh and/or an alloy mesh. As an example, a packer can include one or more springs, which may include a metal spring and/or an alloy spring. As an example, a ring, a mesh, a spring, etc. may be an anti-extrusion component.

As mentioned, an elastomeric material can include reinforcing material, which may be a particulate material. As an example, an elastomeric material can include a carbon-based reinforcing material. As an example, an elastomeric material can include graphene and/or graphene oxide where such graphene and/or graphene oxide acts to reinforce one or more elastomers of the elastomeric material. As an example, graphene can be a reinforcing material. As an example, graphene oxide can be a reinforcing material.

Figure 5:
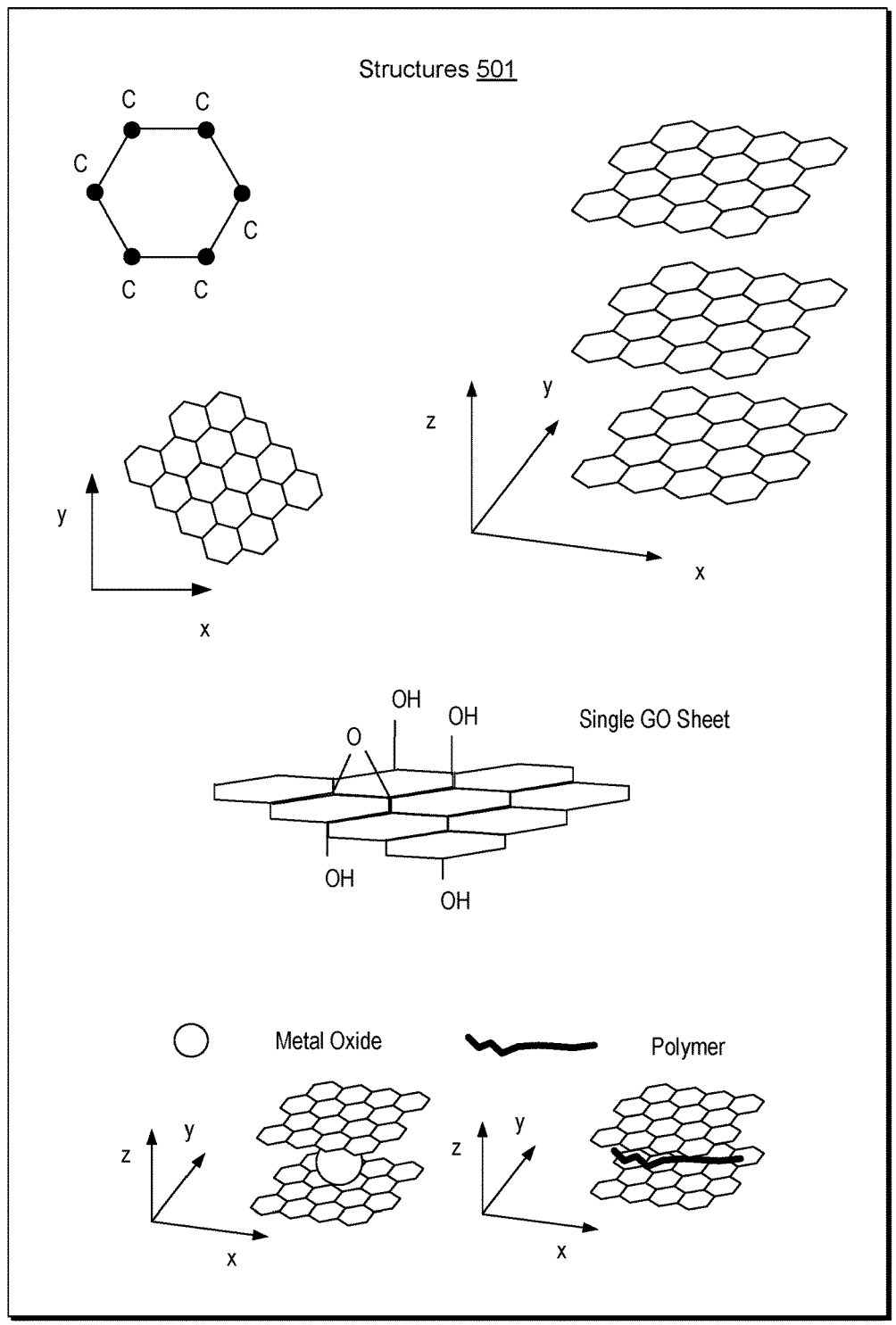
FIG. 5 illustrates examples of structures.

FIG. 5 shows examples of structures 501. While graphite is a three-dimensional carbon-based material made of layers of graphene, graphite oxide differs. By oxidation of graphite using one or more oxidizing agents (e.g., sulfuric acid, sodium nitrate, potassium permanganate, etc.), oxygenated functionalities can be introduced in a graphite structure (e.g., hydroxyl, epoxide, etc.) that can expand layer separation and impart hydrophilicity. The imparted hydrophilicity can allow for exfoliation of graphite oxide in water (e.g., via sonication assist, etc.) to produce single or few layer graphene, which may be referred to as graphene oxide (GO); noting that one or more other techniques for exfoliation may be implemented, additionally or alternatively (e.g., other mechanical, chemical, thermal, etc.). Thus, a difference between graphite oxide and graphene oxide can be the number of layers. For example, a dispersion of graphene oxide may include structures of a few layers or less (e.g., flakes and monolayer flakes); whereas, structures of graphite oxide include more layers. As an example, graphene oxide (GO) may be reduced to form reduced graphene oxide (rGO). As an example, graphene oxide may include surface charge, which may be negative (e.g., consider presence of oxygen), depend on factors such as pH, etc.

As an example, a material may include graphene and a metal oxide bound via hydrogen bonds to the graphene. As an example, a material may include graphene and one or more polymers that may be capable of forming hydrogen bonds and/or other bonds to the graphene. As an example, a material may include graphene, oxide(s) and one or more polymers. As an example, a material may include graphene as graphene oxide (GO).

In FIG. 5, the structures 501 include graphene where, for example, carbon atoms may be arranged in a hexagonal manner, due to $sp^2$ bonding, as a crystalline allotrope of carbon (e.g., as a large aromatic molecule). Graphene may be described as being a one-atom thick layer of graphite and may be a basic structural element of carbon allotropes such as, for example, graphite, charcoal, carbon nanotubes and fullerenes.

As an example, a nanosheet (e.g., or nanoplatelet) may be defined as including a two-dimensional nanostructure that may be characterized in part by a thickness between a lower surface and an upper surface of the nanostructure where the thickness is less than about 100 nanometers. As an example, a graphene nanosheet may include a thickness of the order of about 0.34 nm (e.g., consider a single layer of carbon atoms with hexagonal lattices). As mentioned, a nanosheet may be defined in part by an aspect ratio. As an example, a graphene nanosheet may include an aspect ratio of about 100 or more. As an example, graphene nanosheets that include, on average, an aspect ratio of the order of about 100 or more (e.g., optionally of about 1000 or more) may be used to form one or more types of composite materials. As an example, a larger dimension of a graphene nanosheet (e.g., that may define in part an aspect ratio) may be, for example, of the order of about 100 nanometers or more. As an example, a larger dimension of a graphene nanosheet (e.g., that may define in part an aspect ratio) may be, for example, of the order of about 1 micron or more. As an example, a larger dimension of a graphene nanosheet (e.g., that may define in part an aspect ratio) may be, for example, of the order of about 10 microns or more. As an example, graphene nanosheets may be made and/or provided in a range of dimensions and/or aspect ratios.

As illustrated in FIG. 5, the structures 501 may include a layer of graphene or layers of graphene, which may be described, for example, with respect to a Cartesian coordinate system (x,y,z). As an example, a layer may be bonded to another layer, for example, via interactions that may involve epoxide and hydroxyl groups. As an example, one or more layers may include one or more of epoxide, carbonyl (C=O), hydroxyl (—OH), and phenol groups, which may optionally participate in bond formation. For example, see an approximate representation of a single graphene sheet in the structures 501, which includes various oxygen groups (e.g., a GO sheet).

As an example, layers of graphene may be bonded via one or more metal oxides and hydrogen, for example, magnesium oxide may bind to graphene via hydrogen atoms; and/or layers of graphene may be bonded via one or more polymers and hydrogen (e.g., and/or other group).

As an example, a material may exhibit one or more regions that deviate from planarity (e.g., a buckling like structure). As an example, a material may include disorder and/or irregular packing of layers.

Figure 6:
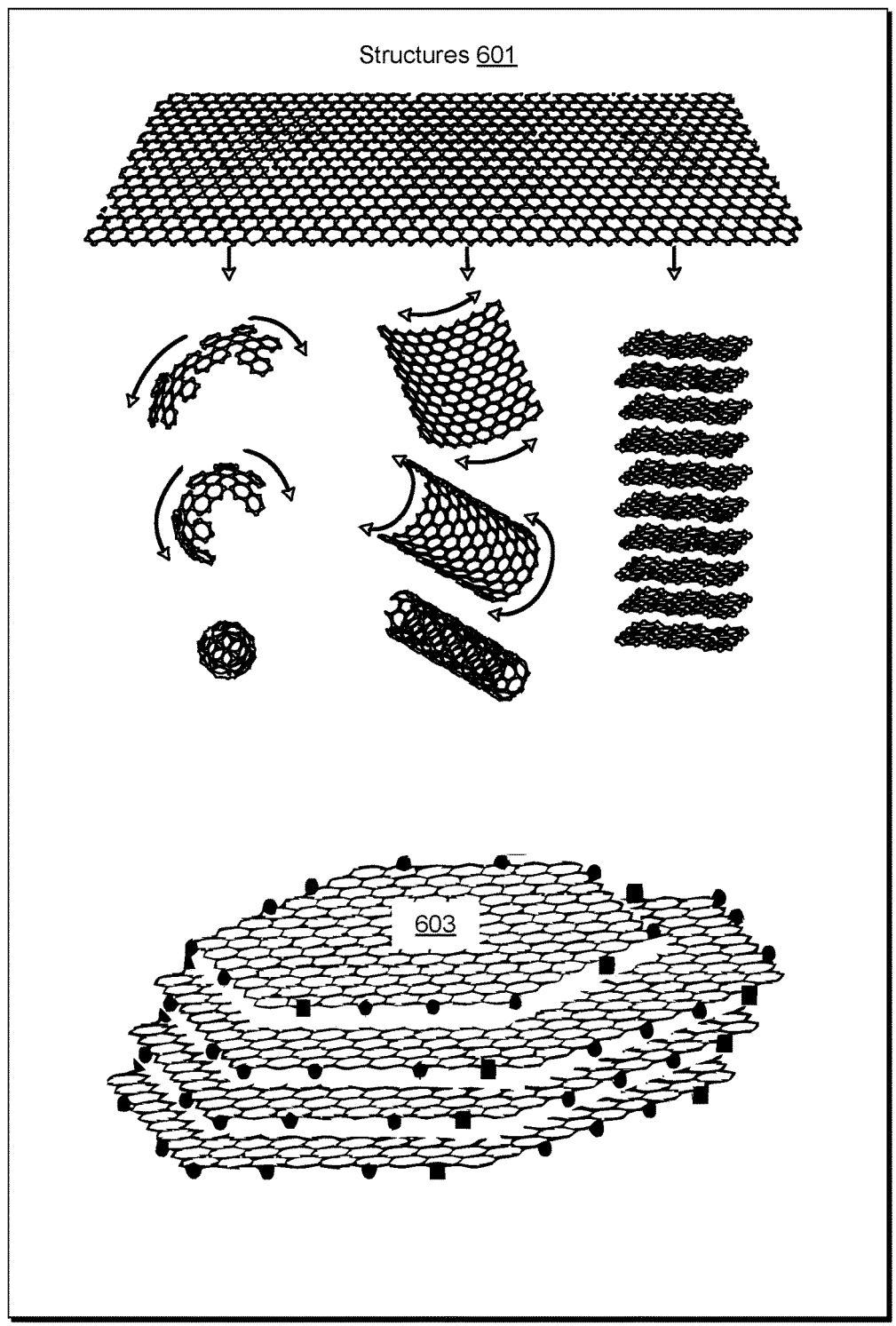
FIG. 6 illustrates examples of structures.

FIG. 6 shows examples of structures 601 and 603. As an example, a structure can be a graphene or a graphene-based structure. As an example, a structure can include a 2-dimensional hexagonal lattice of carbon $sp^2$ hybridized carbon atoms. As an example, a structure can be a "ball" (e.g., 3D structure) such as, for example, a C-60 "bucky ball". As an example, a structure can be a nanotube. As an example, a structure can be graphite. As shown, the structure 603 is plate-like and may be referred to as a nanoplate or nanoplatelet where a plurality may be referred to as nanoplatelets. As an example, nanoplatelets can include oxygen and/or nitrogen atoms. As an example, one or more functional groups may be bonded to a nanoplatelet.

Figure 7:
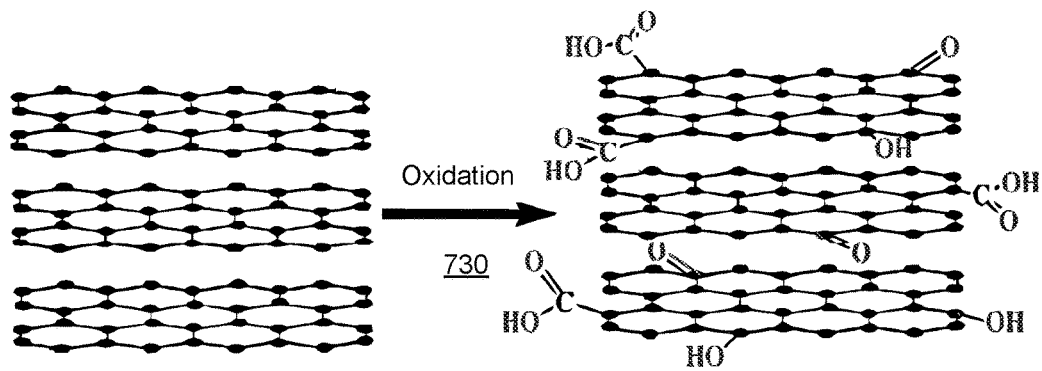
FIG. 7 illustrates an example of a method.
Figure 7:
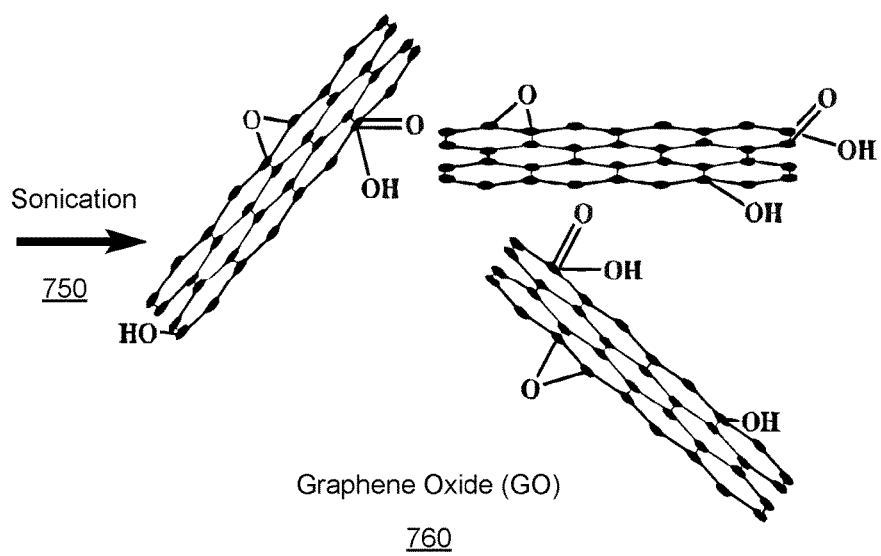

FIG. 7 shows an example of a method 710 that includes providing graphite, oxidizing 730 at least a portion of the graphite 720 to form graphite oxide 740 and sonicating 750 at least a portion of the graphite oxide 740 to form graphene oxide (GO) 760.

As an example, a polymeric material may be an EPDM (e.g., Ethylene-Propylene-Diene-Monomer rubber), for example, manufactured from ethylidenenorbornene (ENB), which is a bicyclic monomer and intermediate that includes two double bonds, each with a different reactivity. ENB can be a diene monomer in the manufacture of EPDM (Ethylene-Propylene-Diene-Monomer) rubber.

Figure 8:
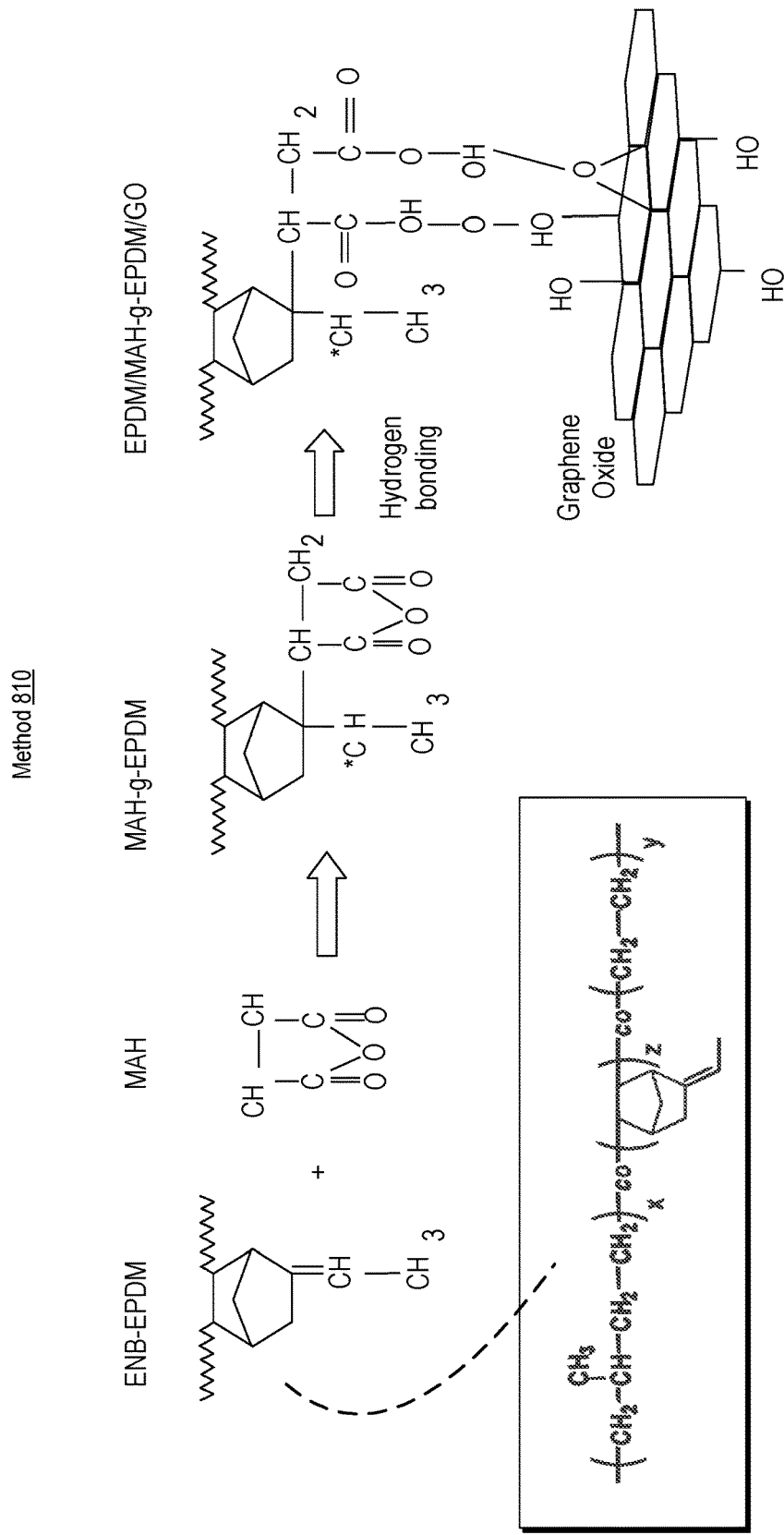
FIG. 8 illustrates an example of a method.

FIG. 8 shows an example of a method 810 that includes reacting ENB-EPDM with maleic anhydride (MAH) to graft the MAH onto the ENB-EPDM. As shown, various functional groups of the MAH can hydrogen bond with various groups of graphene oxide. The method 810 of FIG. 8 is provided as an example of a modification that can be utilized to bond a polymeric material to a carbon-based material such as, for example, graphene oxide.

As mentioned, graphene is a layered material that, for example, can be provided with a relatively high aspect ratio in an exfoliated state. Graphene tends to be strong on a per unit weight basis. Graphene includes functional properties in that it may be bonded to one or more other chemicals.

As an example, graphene nanoplatelets (e.g., nano-graphite) can be of lesser cost than carbon-based nanotubes (CNTs). As an example, graphene can provide gas impermeable characteristic and may improve rapid gas decompression resistance characteristics.

As an example, an elastomeric material can include graphene and can be formed as an elastomeric component (e.g., elastomeric element) as part of one or more types of downhole tools (e.g., packer assemblies, etc.).

As an example, graphene nanoplatelets may be dispersed in a mixture of monomers and/or polymers. For example, consider polypropylene (PP) where chains can adhere to a graphene basal plane. As an example, functional groups on edges of graphene nanoplatelets may be considered. As an example, graphene nanoplatelets can include, for example, the nanoplatelets xGnP™ (XG Sciences, Lansing, Mich.).

As an example, particle size of graphene nanoplatelets can be characterized by a diameter as a dimension (e.g., an effective diameter), which may be, for example, in a range of about 1 micron to about 25 microns, and include surface characteristics in a range of about 120 $m^2/g$ to about 750 $m^2/g$. In such examples, a nanoplatelet may be characterized in a thickness or depth dimension. For example, consider nanoplatelets with an average thickness of approximately 2 nanometers.

As an example, graphene nanoplatelets may be utilized with polyethylene (PE), for example, to form one or more types of multifunctional high density polyethylene nanocomposites. Such an approach can include incorporation of exfoliated graphite nanoplatelets.

As an example, a linear low density PE based elastomeric material can be formed via paraffin coating on exfoliated graphite nanoplatelets.

As an example, as to Nylon 6, one or more types of surfactants may be included in a mixture to enhance compatibility with graphene nanoplatelets as the surface energy level of Nylon 6 tends to be similar to that of the aforementioned xGnP™ nanoplatelets (e.g., consider polar contribution due the amide groups of Nylon 6).

As an example, an elastomeric material can include polycarbonate (PC) and graphene (e.g., consider polyurethane elastomers types polymers that may include polycarbonate diols, etc.).

As an example, an epoxy can include graphene. As an example, such an epoxy may be utilized with one or more other types of materials (e.g., elastomeric materials that may include one or more types of carbon-based nanoparticles, etc.).

As an example, a material can include reduced graphene oxide and natural rubber to form a nanocomposite material. In such an example, a method can include dispersion of reduced graphene oxide (RG-O) into natural rubber (NR), which can enhance mechanical, electrical, and thermal properties of the natural rubber (NR).

As an example, a method can include modification of graphene and fabrication of graphene-based polymer nanocomposites.

As an example, functionalized graphene sheets (FGSs) can be utilized as a reinforcement material in an elastomeric material. In such an example, the FGSs can be predominantly single sheets of graphene with a lateral size of several hundreds of nanometers and a thickness of about 1.5 nm.

As an example, graphite nanoplatelets of expanded graphite can be utilized to form one or more types of polymer composites. As an example, graphite may be expanded from intercalated graphite by microwaves or radiofrequency waves in the presence of a gaseous atmosphere. Such polymer composites can exhibit barrier and/or conductive properties due to the presence of expanded graphite.

As an example, an elastomeric material can include one or more lubricant additives. For example, consider a lubricant additive in at least dynamic seal surface portion of an elastomeric material that can reduce the coefficient of friction and stick-slip amplitude at the surface.

As an example, a rubber composite material can include graphene oxide. For example, consider materials in parts by weight of: 100 parts of chlorosulfonated polyethylene, 10-15 parts of ethylene-vinyl acetate rubber (EVM), 20-25 parts of hydrogenated butadiene-acrylonitrile rubber (HNBR), 0.5-5 parts of graphene oxide, 30-70 parts of hard carbon black with mean grain size of 15-25 nm, 1-10 parts of dioctyl sebacate (DOS), 3-6 parts of zinc oxide, 3-6 parts of stearic acid, 0.5-4 parts of N,N-nickel dibutyl dithiocarbamate, 1-4 parts of dipentamethylenethiuram hexasulfide, 0.5-4 parts of PbO and 1-6 parts of insoluble sulfur. Such a rubber composite can, via chlorosulfonated polyethylene, EVM and HNBR with low acrylonitrile content, balance fuel oil resistance and low temperature resistance.

As an example, a method can include forming a graphene reinforced elastomer composite material for one or more applications such as, for example, downhole seal, packer for downhole use, a blowout protector (BOP), etc. As an example, an elastomeric material can be or include swellable elastomer, which may exhibit high temperature and/or sour gas resistance. As an example, consider EPDM as an oil swellable elastomeric material.

As an example, one or more types of nano-scale reinforcement material can be used to enhance rheological, mechanical and/or physical properties of one or more types of polymers. As an example, a nano-scale material may improve processability, functionality and/or end-use performance of an elastomeric material. As an example, graphite (e.g., graphene nanoplatelets) can be utilized as reinforcement where relatively large specific surface area, high strength and high surface reactivity can be beneficial to modify properties of one or more types of elastomers.

As an example, graphite (e.g., graphene nanoplatelets) can be used as a single-reinforcement filler or alternatively with one or more other filler materials such as, for example, silica, carbon black, etc.

As to types of polymers, a polymeric material can include, for example, one or more types of carboxylated nitrile rubber compounds (XNBR), which may provide better strength properties, especially abrasion resistance, when compared to NBR (e.g., without carboxylation). As an example, carboxylated nitriles may be produced by inclusion of carboxylic acid groups (e.g., as polymer groups during polymerization). In such an example, carboxylic acid groups can provide extra crosslinks (e.g., pseudo or ionic crosslinks) and thereby produce harder, tougher compounds with higher abrasion resistance, modulus, and tensile strength than standard nitriles.

As an example, a polymeric material can include, for example, one or more types of HNBR. HNBR can include so-called highly saturated hydrocarbons and acrylonitrile (ACN) where, for example, increased saturation is achieved via hydrogenation of unsaturated bonds. As an example, increased saturation can impart (e.g., improve) heat, chemical, and ozone resistance. As an example, ACN content of HNBR can impart toughness, as well as resistance to hydrocarbons. Where unsaturated butadiene segments exist (e.g., less than about 10 percent), such sites may facilitate peroxide curing and/or vulcanization. As an example, a peroxide-cured HNBR may exhibit improved thermal properties without further vulcanization (e.g., as with sulfur-cured nitriles).

As an example, a polymeric material can include, for example, one or more types of fluoroelastomers, which may be abbreviated as FKMs. FKM (FPM by ISO) is a designation for about 80 percent of fluoroelastomers as defined in ASTM D1418. FKMs may exhibit heat and fluid resistance. For example, in FKMs, bonds between carbon atoms of the polymer backbone and attached (pendant) fluorine atoms tend to be resistant to chain scission and relatively high fluorine-to-hydrogen ratios can provide stability (e.g., reduced risk of reactions or environmental breakdown). Further, FKMs tend to include a carbon backbone that is saturated (e.g., lacking covalent double bonds, which may be attack sites). Elastomers such as one or more of the VITON™ class of FKM elastomers (E. I. du Pont de Nemours & Co., Wilmington, Del.) may be used (e.g., VITON™ A, VITON™ B, VITON™ F, VITON™ GF, VITON™ GLT, VITON™ GFLT, etc.).

On the basis of their chemical composition various FKMs may be divided into the following types: Type 1 FKMs are composed of vinylidene fluoride (VDF) and hexafluoropropylene (HFP); Type 2 FKMs are composed of VDF, HFP, and tetrafluoroethylene (TFE); Type 3 FKMs are composed of VDF, HFP, TFE, perfluoromethylvinylether (PMVE); Type 4 FKMs are composed of propylene, TFE, and VDF; Type 5 FKMs are composed of VDF, HFP, TFE, PMVE, and ethylene. Other categories of polymers can include FFKM and FEPM.

As an example, a polymeric material can include, for example, one or more types of a polyvinylidene fluoride (PVDF), which may be a relatively non-reactive and thermoplastic fluoropolymer produced at least in part by polymerization of vinylidene difluoride. As an example, a PVDF may be melt processed, for example, depending on melting point (e.g., due to modifiers, fillers, etc.). As an example, a PVDF may have a density of about 1.78. As an example, a material may include a co-polymer of PVDF and HFP (e.g., poly(vinylidene fluoride-co-hexafluoropropylene), which may be abbreviated as PVDF-HFP).

Figure 9:
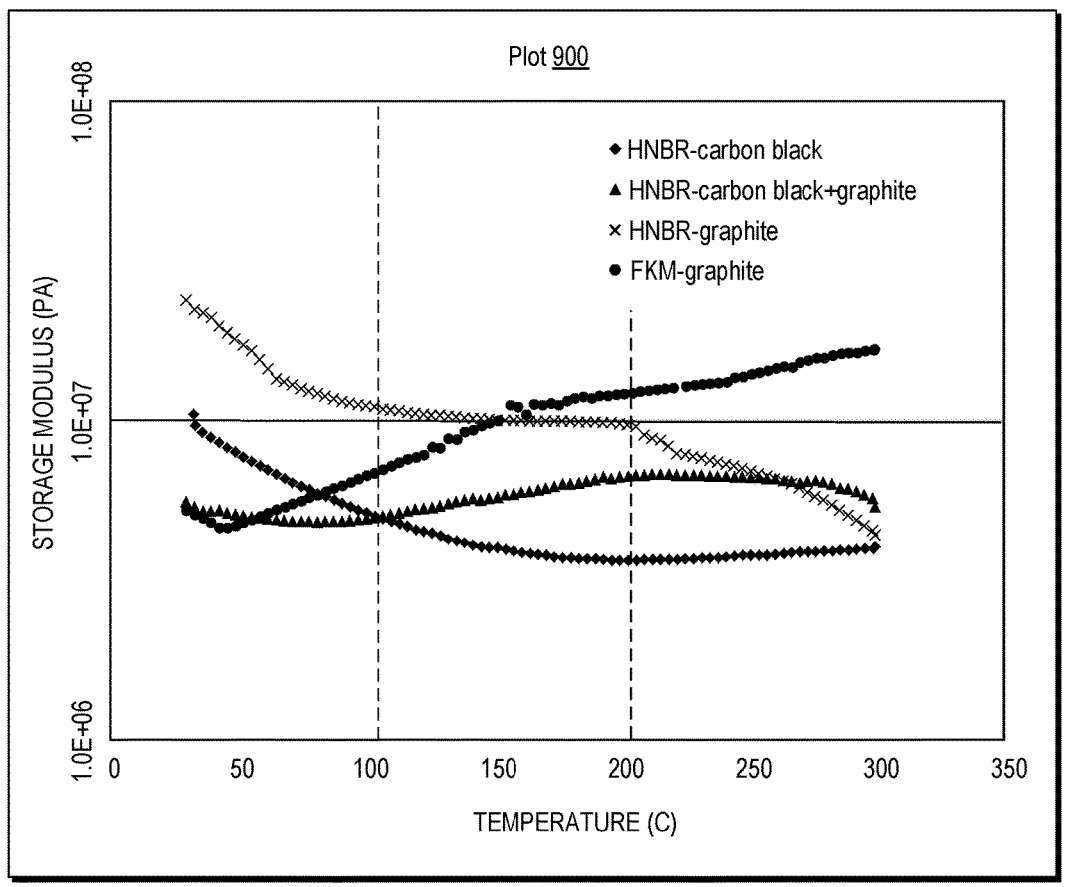
FIG. 9 illustrates an example of a plot.

FIG. 9 shows an example of a plot 900 for elastomeric materials that include graphite (e.g., graphene nanoplatelets) as reinforcing filler. The plot 900 shows data as to storage modulus as well as thermal resistance of an HNBR elastomer. The data in the plot 900 indicate enhancement of modulus at temperatures in a range of about 150 degrees C. to about 200 degrees C. when compared to carbon black filled HNBR. The plot 900 also shows graphite (e.g., graphene nanoplatelets) filled FKM as having the highest thermal stability, up to about 300 degrees C. As shown for various example elastomeric materials corresponding to data in the plot 900, enhancements to properties can be achieved at filler concentrations at less than approximately 10 percent by weight.

Figure 10:
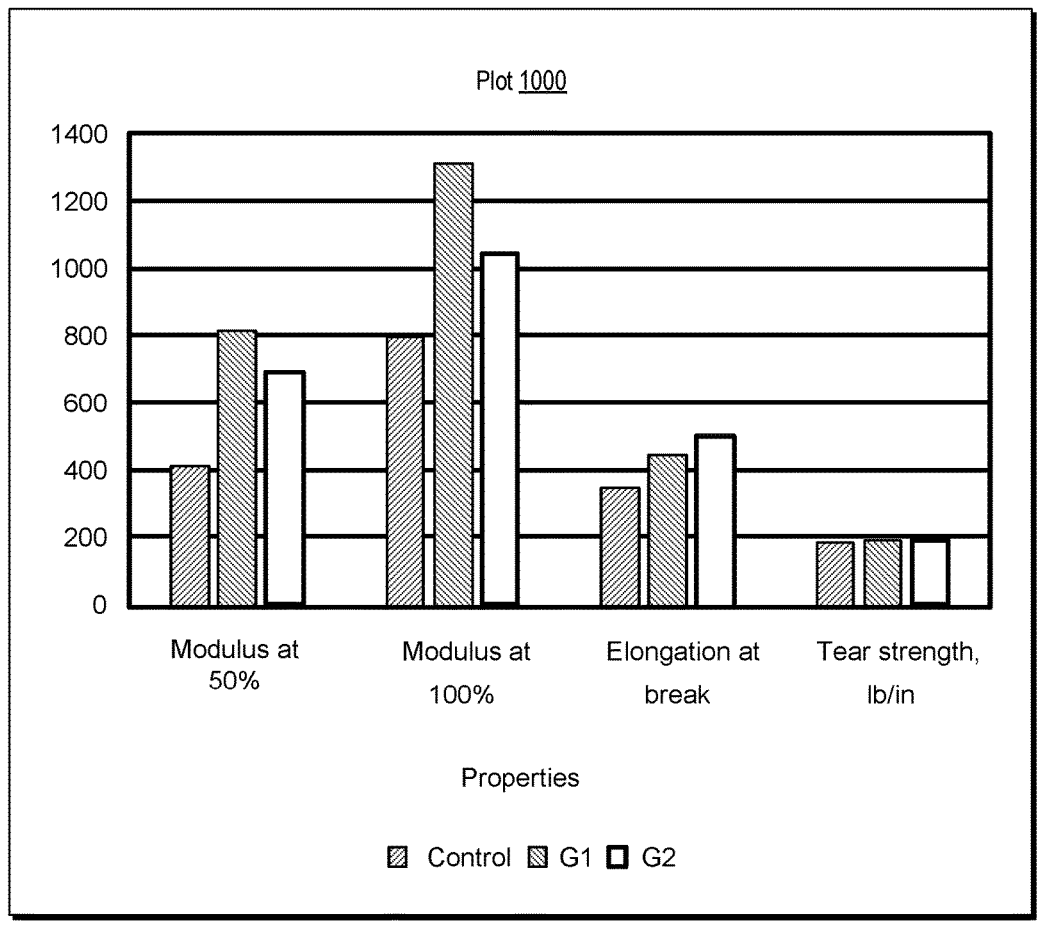
FIG. 10 illustrates an example of a plot.

FIG. 10 shows an example of a plot 1000 as to property comparisons with a control (HNBR-carbon black) and two graphene nanoplatelets reinforced HNBRs. For G1 compounds, the data indicate an enhancement of modulus at about 50 percent and at about 100 percent and a slight increase in elongation at break and with a relatively similar level of tear strength.

TABLE 1

| | Data of Plot 1000 | | | | |
|---|---|---|---|---|---|
| Material | Modulus 50% (psi) | Modulus 100% (psi) | Elongation (percent) | Tear Strength (lb/in) | Storage Modulus (300 C., psi) |
| Control | 416 | 800 | 351 | 182 | 860 |
| G1 | 817 | 1312 | 443 | 193 | 1465 |
| G2 | 689 | 1041 | 512 | 190 | 1401 |

Figure 11:
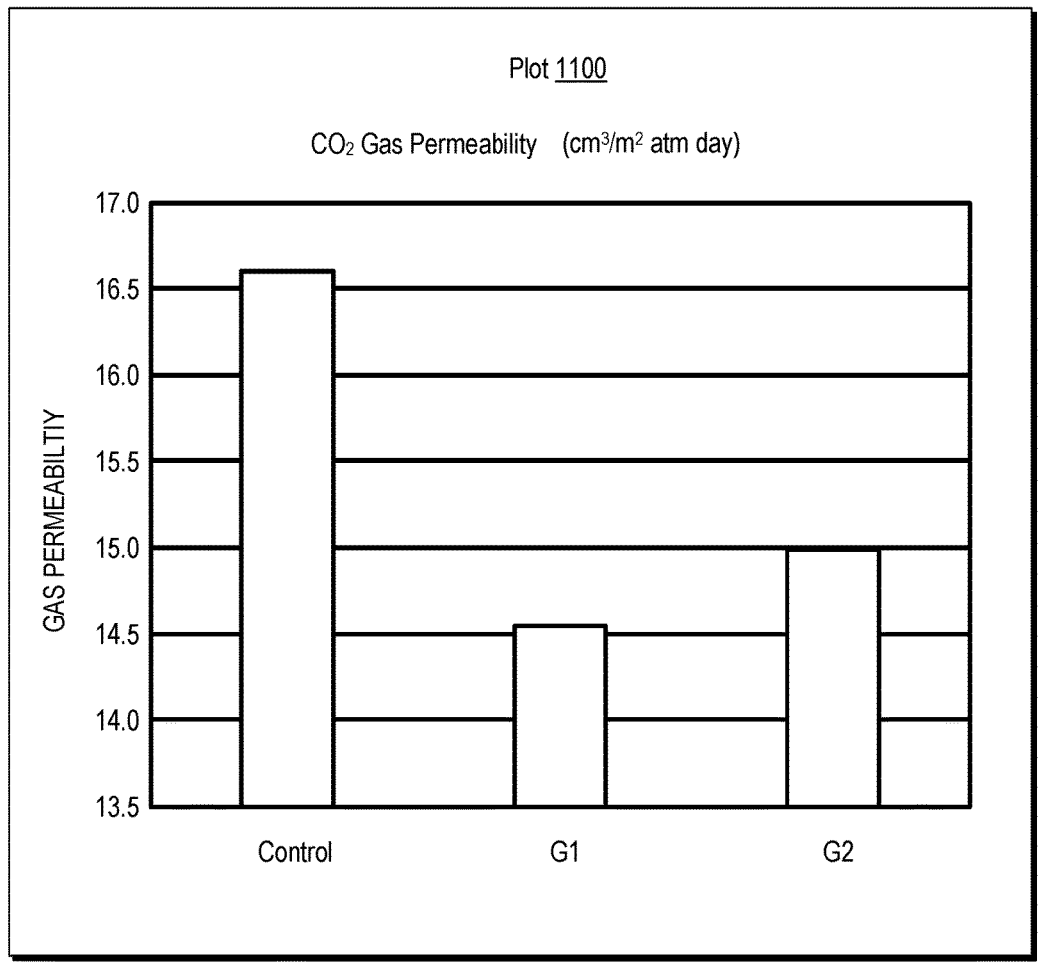
FIG. 11 illustrates an example of a plot.

FIG. 11 shows an example of a plot 1100 that includes data for gas permeability as to the control, G1 and G2. As shown in the plot 1100, $CO_2$ permeability is less in G1 and G2 polymeric materials than in the control polymeric material.

As demonstrated via the example polymeric materials (e.g., elastomeric materials), inclusion of carbon-based nanoparticles such as, for example, graphene nanoplatelets, can reinforce a polymeric matrix. For example, such reinforcement can enhance mechanical properties, particularly at temperatures of interest for various applications, and, for example, can decrease permeability as to gas. As to the latter, decreased gas permeability can be characterized as a gas barrier property. As an example, a polymeric material that includes one or more types of carbon-based nanoparticles (e.g., graphene nanoplatelets, etc.) can exhibit decreased permeability as to one or more gasses, which can be beneficial for one or more types of downhole applications.

As an example, a method can include mixing graphite (e.g., graphene nanoplatelets) with one or more types of polymers such as, for example, one or more of HNBR, NBR, VITON™ polymer, VITON™ Extreme polymer, AFLAS™ fluororubber, FFKM rubber, etc. where the graphite can be dispersed within a matrix formed by the one or more types of polymers. As an example, a component made at least in part from such a resulting polymeric material may be suitable for one or more types of downhole seal applications such as, for example, as a portion of a packer assembly (e.g., a packer or seal element). As an example, equipment that includes a packer may itself be referred to as a "packer" (see, e.g., the multistage packer 260 of FIG. 2). As an example, equipment such as a blowout protector (BOP), etc., may include one or more types of polymeric materials that include one or more forms of carbon-based material (e.g., carbon ring based materials such as, for example, graphite, etc.).

As an example, a method can include dispersing graphite (e.g., graphene nanoplatelets) in an elastomeric fluid in a manner that acts to reduce aggregation of the graphite (e.g., nanoparticles) in the elastomeric fluid.

As an example, nano-scale graphite can be dispersed in a dry form of additives to provide a nanoparticle pre-blend and then mixed with base elastomer such as, for example, one or more of HNBR, FKM, AFLAS™ fluororubber (FEPM), and FFKM, to form a relatively homogenous elastomer composite.

As an example, nano-scale graphite can be dispersed in a liquid form polymer such as, for example, liquid NBR to provide a nanoparticle pre-blended "master" batch that can be mixed with a base resin such as, for example, one or more of HNBR, FKM to form a relatively homogenous elastomer composite material.

As an example, graphene nanoplatelets can be surface treated by carboxy-terminated butadiene-acroylonitrile (CTBN) to promote dispersion. As an example, CTBN can be used for modification of surface of carbon materials including carbon nanotubes.

As an example, carboxyl-modified multi-walled carbon nanotubes (MWCNT-COOHs) (e.g., suitable for use as nano-scale particles) can be incorporated into diglycidyl ether of bisphenol A (DGEBA) toughened with carboxyl-terminated butadiene-acrylonitrile (CTBN). As an example, addition of MWCNT-COOHs can accelerate curing reaction of a rubber-toughened epoxy resin (e.g., as may be shown via differential scanning calorimetry). As an example, Tg of rubber-toughened epoxy nanocomposites may be lowered with inclusion of MWCNT-COOH. As an example, tensile strength, elongation at break, flexural strength and flexural modulus of DGEBA/CTBN/MWCNT-COOHs nanocomposites can be increased in relationship to MWCNT-COOH concentration. As an example, a relatively homogenous dispersion of nanocomposites can be achieved via use of MWCNT-COOH.

Figure 12:
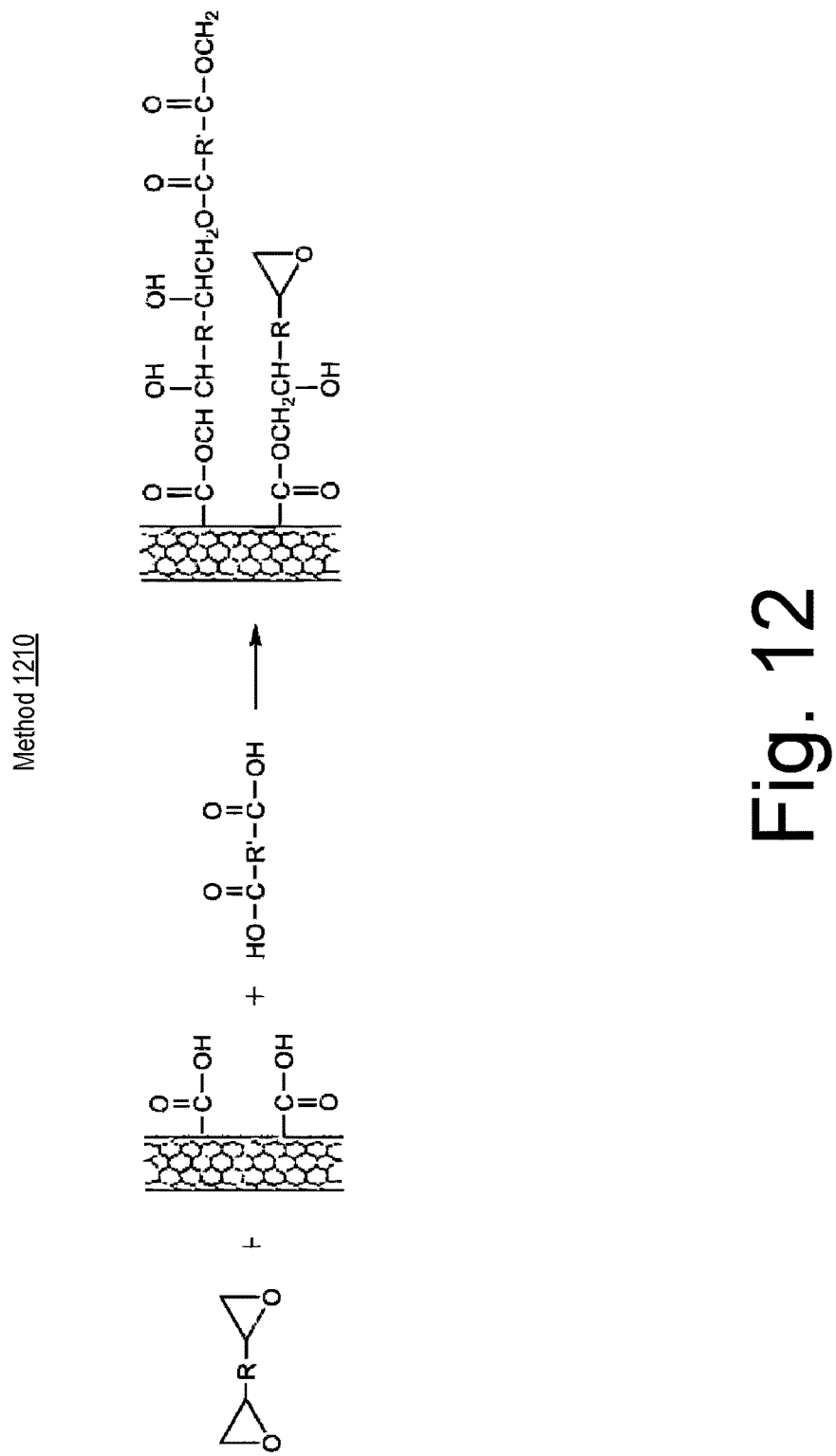
FIG. 12 illustrates an example of a method.
Figure 13:
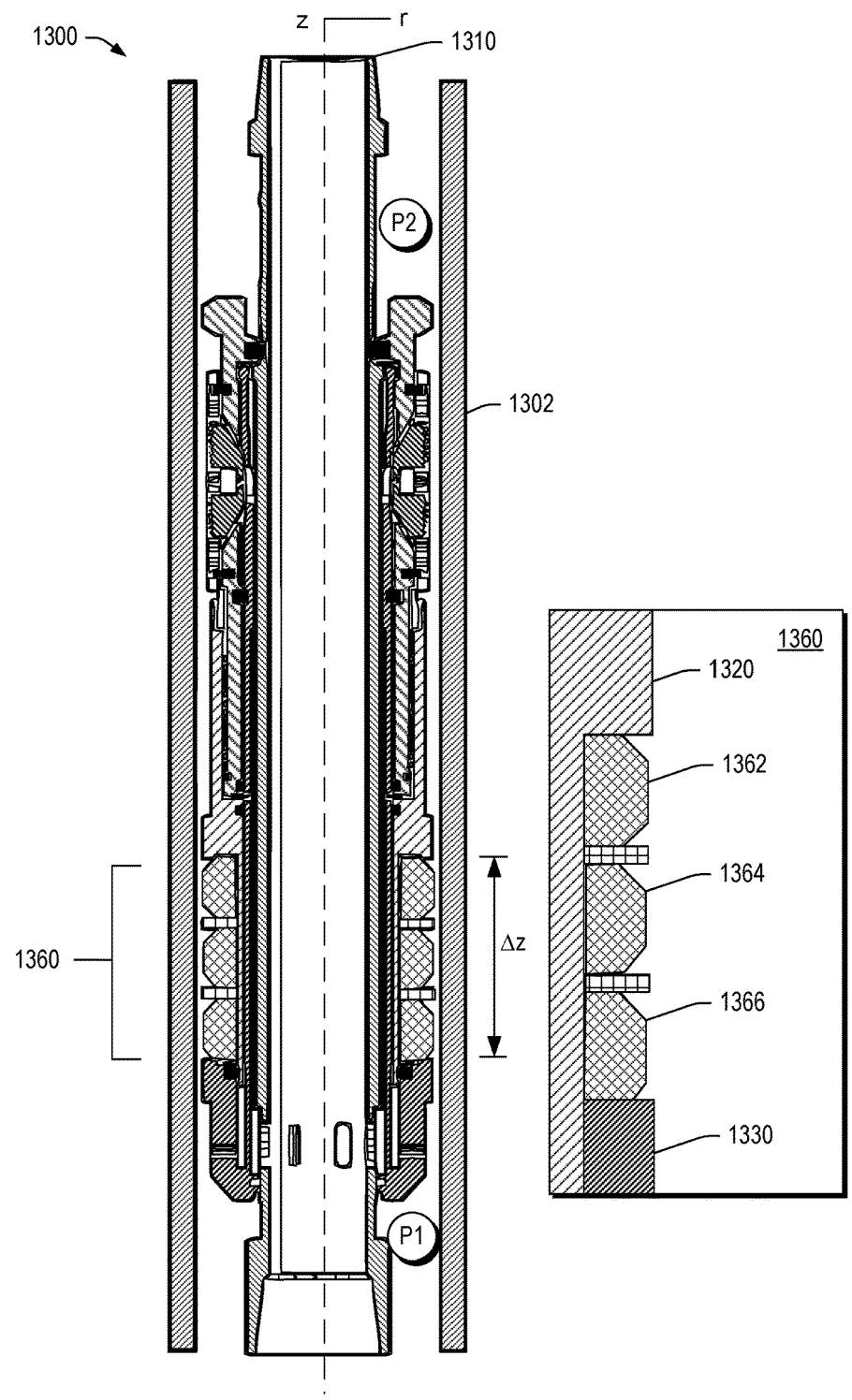
FIG. 13 illustrates an example of equipment.

FIG. 12 shows an example of a method 1210 of modifying carbon nanotubes (CNTs) via carboxyl groups. In particular, FIG. 12 shows the method 1210 as including a reaction scheme between carboxyl groups in CTBN and MWCNT-COOHs and epoxy groups in DGEBA.

As an example, one or more types of graphene reinforced elastomeric materials can exhibit relatively high temperature resistant and/or gas resistance. Such materials may be suitable for one or more types of downhole oilfield applications.

As an example, an application may be a seal application where one or more seal elements are made at least in part from a graphene reinforced elastomer. As an example, consider an HNBR-based elastomeric material for drilling mud motor for better solvent resistance and fatigue. As an example, consider a swellable elastomeric material for one or more types of downhole applications that can include use of a packer or packers. As an example, an elastomeric material can be utilized in a surface BOP packer assembly as a seal element.

FIG. 12 shows an example of a system 1300 that includes a casing 1302 (e.g., a tube or tubular) and equipment 1310 disposed at least in part in a bore of the casing 1302. As shown, the equipment 1310 includes components 1320 and 1330 that define axial limits (e.g., axial stop surfaces) between which exist a packer 1360 that can include portions such as portions 1362, 1364 and 1366. As an example, one or more of the components 1320 and 1330 can move axially to apply force to the packer 1360. In such an example, the packer 1360 may expand at least in part radially such that the packer 1360 contacts an inner surface of the casing 1302. In such an example, as indicated by pressures P1 and P2, a pressure differential may be developed where the packer 1360 forms a seal between, for example, the component 1320 and the inner surface of the casing 1302.

With reference to the portions 1362, 1364 and 1366 of the packer 1360, these may be made of the same elastomeric material or made of one or more different types of elastomeric materials. As an example, such materials may be formed via a compression modeling process.

As an example, one or more elastomeric materials may be selected at least in part based on friction coefficient. As an example, one or more elastomeric materials may be bonded with one or more components, which can include, for example, one or more metal, alloy, ceramic and/or hard plastic materials.

As an example, a packer may be utilized to seal a tool or tubing with respect to another tool or tubing. As an example, a packer shaped as a ring or other annular shape may include an outer diameter that is in a range of about 5 cm to about 50 cm. As an example, a packer can be shaped as a ring or other type of annular shape may include an inner diameter that is sized to fit about an outer surface of a tool or tubing. As an example, an inner diameter may be in a range of about 0.5 cm to about 49.5 cm.

Figure 14:
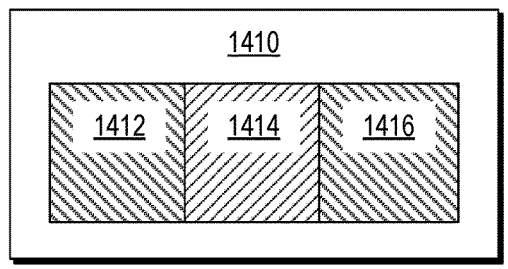
FIG. 14 illustrates examples of equipment.
Figure 14:
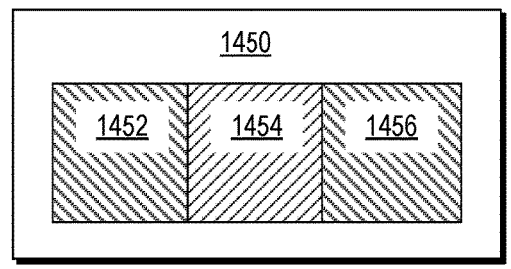
Figure 14:
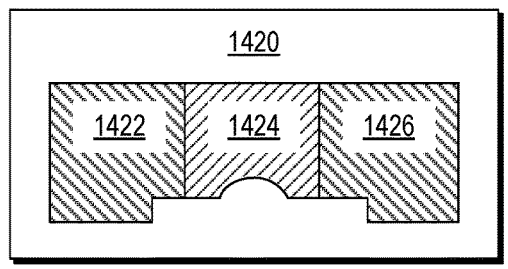
Figure 14:
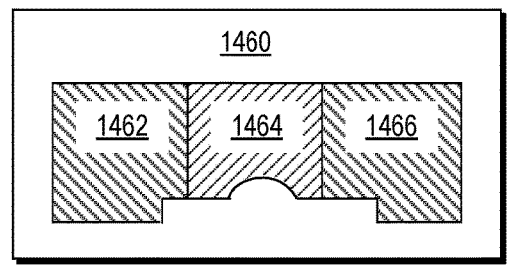
Figure 14:
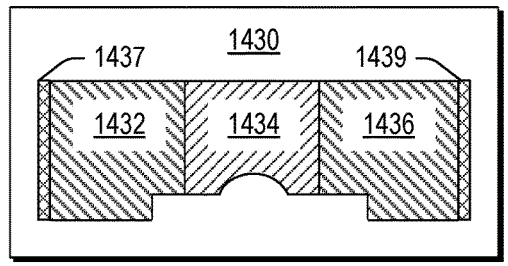
Figure 14:
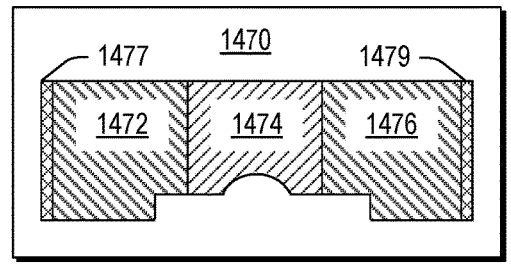
Figure 14:
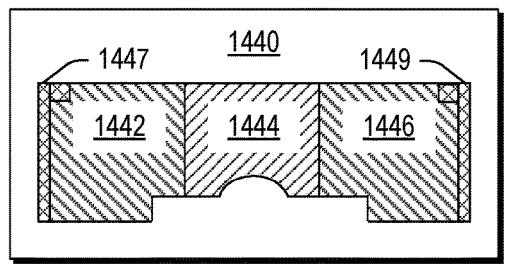
Figure 14:
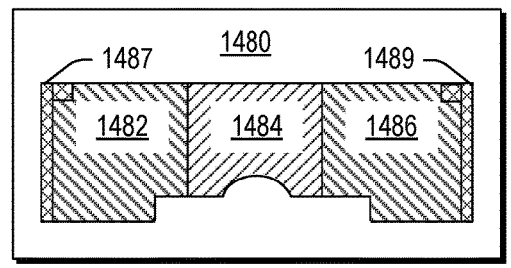

FIG. 14 shows some examples of arrangements of packers 1410, 1420, 1430, 1440, 1450, 1460, 1470 and 1480.

As an example, for the packer 1410, portions 1412 and 1416 can be made of 90/95 duro elastomeric graphene filled material with a temperature rating to about 200 degrees C. (e.g., about 400 degrees F.) and a portion 1414 may be made of 70/75 duro elastomeric graphene filled material with a temperature rating to about 200 degrees C. (e.g., about 400 degrees F.).

As an example, for the packer 1420, portions 1422 and 1426 can be made of 90/95 duro elastomeric graphene filled material with a temperature rating to about 200 degrees C. (e.g., about 400 degrees F.) and a portion 1424 may be made of 70/75 duro elastomeric graphene filled material with a temperature rating to about 200 degrees C. (e.g., about 400 degrees F.).

As an example, for the packer 1430, portions 1432 and 1436 can be made of 90/95 duro elastomeric graphene filled material with a temperature rating to about 200 degrees C. (e.g., about 400 degrees F.) and a portion 1434 may be made of 70/75 duro elastomeric graphene filled material with a temperature rating to about 200 degrees C. (e.g., about 400 degrees F.). As shown, the packer 1430 can include one or more anti-extrusion components 1437 and 1439 such as, for example, one or more anti-extrusion meshes, springs, etc. In such an example, one or more of the one or more anti-extrusion components 1437 and 1439 may be bonded to the elastomeric material of a portion or portions of the packer 1430.

As an example, for the packer 1440, portions 1442 and 1446 can be made of 90/95 duro elastomeric graphene filled material with a temperature rating to about 200 degrees C. (e.g., about 400 degrees F.) and a portion 1444 may be made of 70/75 duro elastomeric graphene filled material with a temperature rating to about 200 degrees C. (e.g., about 400 degrees F.). As shown, the packer 1440 can include one or more anti-extrusion components 1447 and 1449 such as, for example, one or more anti-extrusion meshes, springs, etc. In such an example, one or more of the one or more anti-extrusion components 1447 and 1449 may be bonded to the elastomeric material of a portion or portions of the packer 1440.

As an example, for the packer 1450, portions 1452 and 1456 can be made of 90/95 duro elastomeric graphene filled material with a temperature rating to about 200 degrees C.

(e.g., about 400 degrees F.) and a portion 1454 may be made of 80/85 duro elastomeric graphene filled material with a temperature rating to about 200 degrees C. (e.g., about 400 degrees F.).

As an example, for the packer 1460, portions 1462 and 1466 can be made of 90/95 duro elastomeric graphene filled material with a temperature rating to about 200 degrees C. (e.g., about 400 degrees F.) and a portion 1464 may be made of 80/85 duro elastomeric graphene filled material with a temperature rating to about 200 degrees C. (e.g., about 400 degrees F.).

As an example, for the packer 1470, portions 1472 and 1476 can be made of 90/95 duro elastomeric graphene filled material with a temperature rating to about 200 degrees C. (e.g., about 400 degrees F.) and a portion 1474 may be made of 80/85 duro elastomeric graphene filled material with a temperature rating to about 200 degrees C. (e.g., about 400 degrees F.). As shown, the packer 1470 can include one or more anti-extrusion components 1477 and 1479 such as, for example, one or more anti-extrusion meshes, springs, etc. In such an example, one or more of the one or more anti-extrusion components 1477 and 1479 may be bonded to the elastomeric material of a portion or portions of the packer 1470.

As an example, for the packer 1480, portions 1482 and 1486 can be made of 90/95 duro elastomeric graphene filled material with a temperature rating to about 200 degrees C. (e.g., about 400 degrees F.) and a portion 1484 may be made of 80/85 duro elastomeric graphene filled material with a temperature rating to about 200 degrees C. (e.g., about 400 degrees F.). As shown, the packer 1480 can include one or more anti-extrusion components 1487 and 1489 such as, for example, one or more anti-extrusion meshes, springs, etc. In such an example, one or more of the one or more anti-extrusion components 1487 and 1489 may be bonded to the elastomeric material of a portion or portions of the packer 1480.

Figure 15:
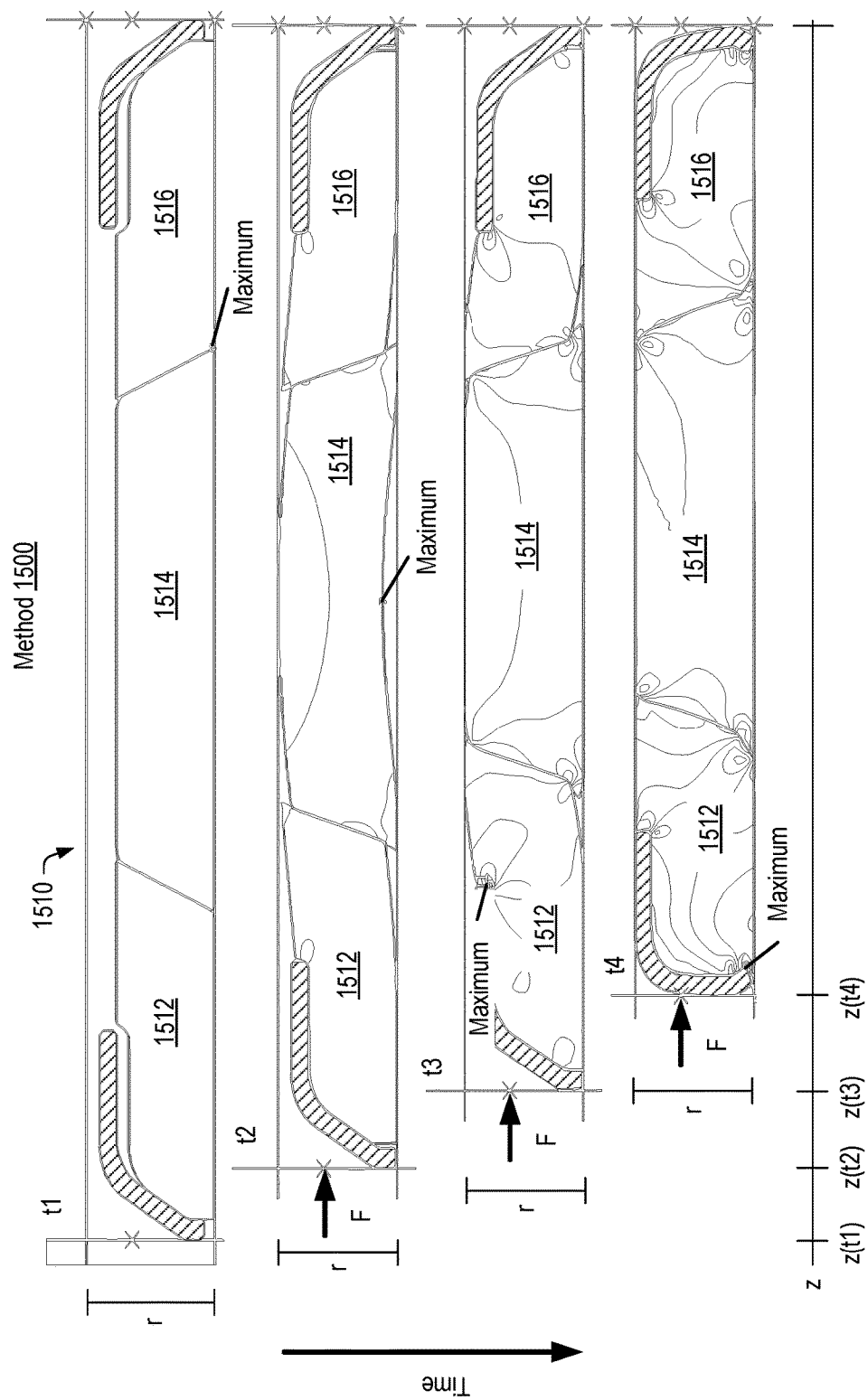
FIG. 15 illustrates an example of a method.

FIG. 15 shows an example of a method 1500 that shows stress profiles for a packer 1510 that includes three portions 1512, 1514 and 1516 with respect to time during a setting operation where the packer 1510 is disposed between two surfaces. As an example, the method 1500 can be a single step setting for the packer 1510; noting that, for example, a method may include a shear-slip setting for a packer.

As shown in FIG. 15, a location of maximum stress can change during a setting process where, for example, it may be located at a boundary between portions 1514 and 1516, then within the portion 1514, then at a boundary with a component that acts to retain the portion 1512, etc.

As an example, a middle portion of a packer (e.g., a middle element) may deform more than an end portion of a packer (e.g., an end element). As an example, where a packer includes multiple elements, the materials of construction of the elements may be selected based at least in part on evolution of shapes, stresses, etc., with respect to time. For example, as explained with respect to various examples of FIG. 14, a material of construction of an end portion (e.g., end element) may differ from a material of construction of a portion that is not at an end (e.g., an intermediate element).

As an example, a geologic environment or downhole environment may be a harsh environment and/or an environment that may be classified as being a high-pressure and high-temperature environment (e.g., a HPHT environment). As an example, an environment may be classified based at least in part on its chemical composition. For example, where an environment includes hydrogen sulfide ($H_2S$), carbon dioxide ($CO_2$), etc., the environment may be corrosive to certain materials. As an example, an environment may be classified based at least in part on particulate matter that may be in a fluid (e.g., suspended, entrained, etc.). As an example, particulate matter in an environment may be abrasive or otherwise damaging to equipment. As an example, conditions in a geologic environment may be transient and/or persistent.

As an example, an elastomeric material or elastomeric materials may be made and/or selected based at least in part on conditions in an environment in which the material or materials are to be used. As an example, an elastomeric material or elastomeric materials may be made and/or selected based at least in part on one or more operational conditions of equipment in an environment. As an example, an elastomeric material or elastomeric materials may be made and/or selected based at least in part on conditions in an environment in which the material or materials are to be used and/or one or more operational conditions of equipment in an environment.

Figure 16:
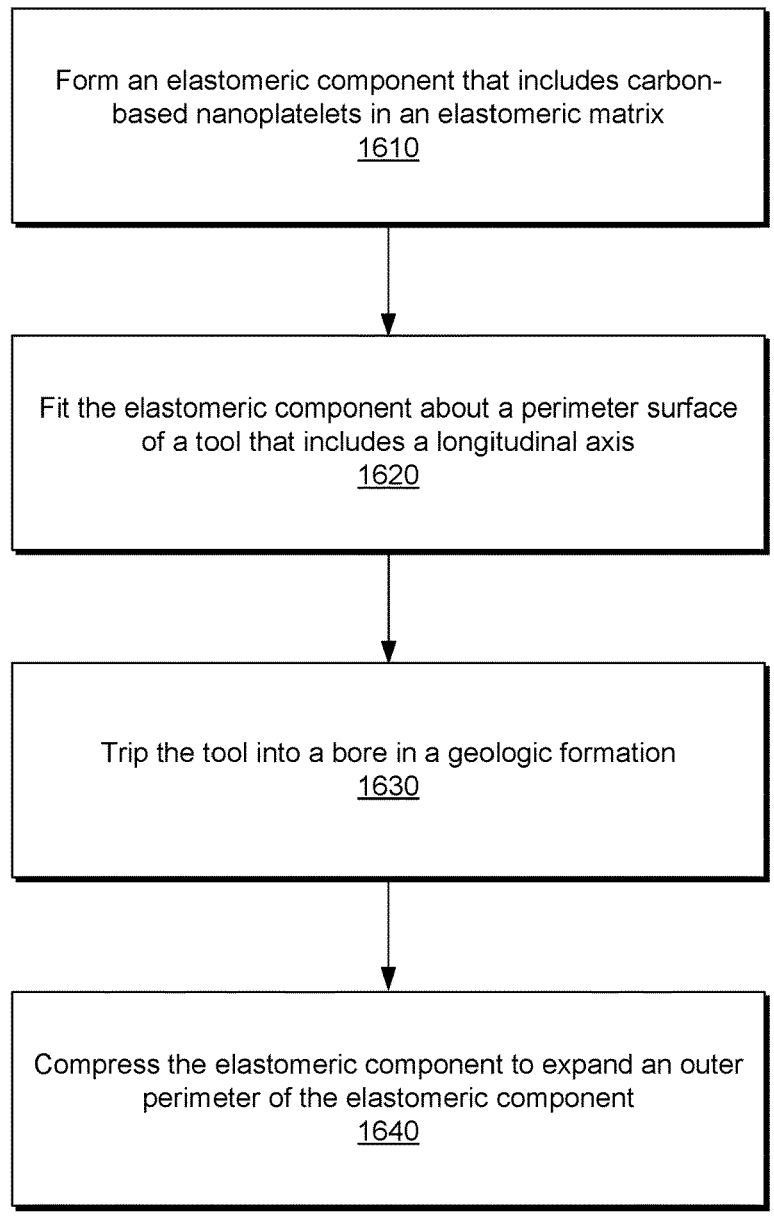
FIG. 16 illustrates an example of a method.

FIG. 16 shows an example of a method 1600 that includes a formation block 1610 for forming an elastomeric component that includes carbon-based nanoplatelets in an elastomeric matrix; a fitting block 1620 for fitting the elastomeric component about a perimeter surface of a tool that includes a longitudinal axis; and a tripping block 1630 for tripping the tool into a bore in a geologic formation. In such an example, the carbon-based nanoplatelets can include one or more types of chemically modified carbon-based nanoplatelets. As an example, the method 1600 may include a compression block 1640 for compressing the elastomeric component to expand an outer perimeter of the elastomeric component (e.g., to form a seal with respect to a wall in the geologic environment such as an earthen wall, a casing wall, etc.). As an example, the method 1600 can include fitting an elastomeric component about an inner perimeter surface or an outer perimeter surface of a tool (e.g., a component of a tool). In such examples, compression may compress the elastomeric component to decrease its inner perimeter or to increase its outer perimeter, respectively.

Figure 17:
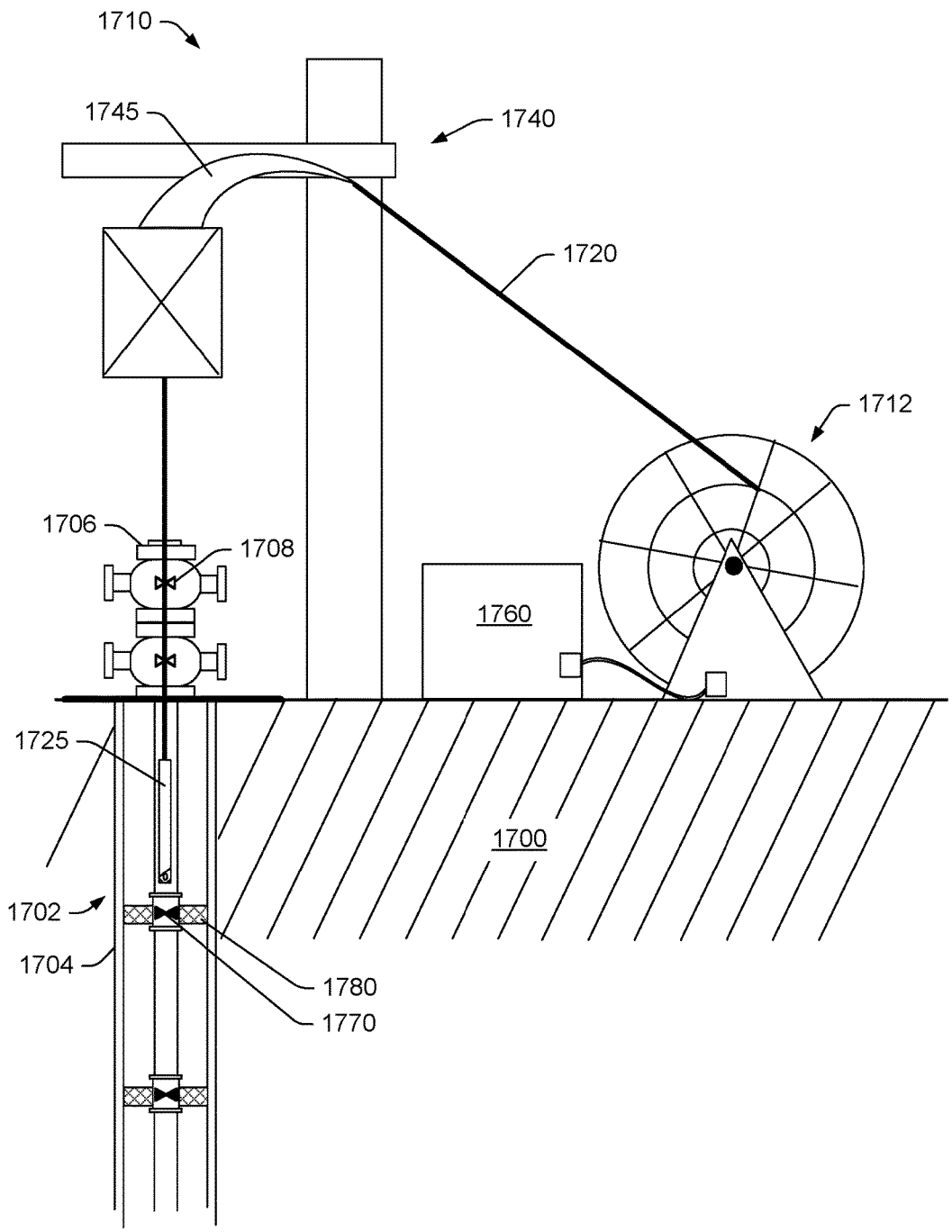
FIG. 17 illustrates an example of a system.

FIG. 17 shows an example of a geologic environment 1700 and a system 1710 positioned with respect to the geologic environment 1700. As shown, the geologic environment 1700 may include at least one bore 1702, which may include casing 1704 and well head equipment 1706 (e.g., blowout protector, etc.), which may include a sealable fitting 1708 that may form a seal about a cable 1720. In the example of FIG. 17, the system 1710 may include a reel 1712 for deploying equipment 1725 via the cable 1720. As an example, the equipment 1725 may be a tool (e.g., a downhole tool). As an example, the system 1710 may include a structure 1740 that may carry a mechanism such as a gooseneck 1745 that may function to transition the cable 1720 from the reel 1712 to a downward direction for positioning in the bore 1702.

As shown in the example of FIG. 17, a unit 1760 may include circuitry that may be electrically coupled to the equipment 1725. As an example, the cable 1720 may include or carry one or more wires and/or other communication equipment (e.g., fiber optics, rely circuitry, wireless circuitry, etc.) that may be operatively coupled to the equipment 1725. As an example, the unit 1760 may process information transmitted by one or more sensors, for example, as operatively coupled to or as part of the equipment 1725. As an example, the unit 1760 may include one or more controllers for controlling, for example, operation of one or more components of the system 1710 (e.g., the reel 1712, etc.). As an example, the unit 1760 may include circuitry to control depth/distance of deployment of the equipment 1725.

As an example, the system 1710 may include one or more stuffing boxes, one or more lubricator, one or more blow-out protectors, etc. As an example, the system 1710 can include one or more downhole pieces of equipment such as, for example, one or more downhole valve units 1770, one or more control line associated with one or more units, one or more packer assemblies 1780, etc. As an example, one or more pieces of equipment, tools, etc. in the system 1710 may include an elastomeric material that includes carbon-based (carbon ring-based) nanoparticles such as, for example, nanoplatelets.

As an example, the system 1710 may be utilized to trip equipment in to and out of the bore 1702. As an example, a system may be or include a rig. As an example, the system 1710, a rig, etc., may be utilized to move and position one or more types of tools in a bore. As an example, a method can include tripping in and/or tripping out equipment with respect to a bore.

As an example, the system 1710 may include one or more stuffing boxes, one or more lubricator, one or more blow-out protectors, etc. As an example, the system 1710 can include one or more downhole pieces of equipment such as, for example, one or more downhole valve units, one or more control line associated with one or more units, one or more packer assemblies, etc.

As an example, a bore tool can include a component that includes a longitudinal axis and a perimeter surface disposed at one or more radii from the longitudinal axis; and an elastomeric component disposed about the perimeter surface where the elastomeric component includes an elastomeric material that includes carbon-based nanoplatelets. In such an example, the bore tool can be or include a bore packer assembly. As an example, such a bore packer assembly can include a force applicator that is actuatable to apply force to the elastomeric component to at least in part increase a perimeter of the elastomeric component.

As an example, a bore tool can include slips. As an example, a bore tool can be or include a blowout protector (BOP).

As an example, a bore tool can include two elastomeric components where an axial gap exists between the two elastomeric components and where at least one of the two elastomeric components includes carbon-based nanoplatelets.

As an example, a bore tool can include two elastomeric components that contact each other where at least one of the two elastomeric components includes carbon-based nanoplatelets.

As an example, where a bore tool includes a plurality of elastomeric components, one elastomeric component can include a first elastomeric material composition and another of the elastomeric components can include a second elastomeric material composition that differs from the first elastomeric material composition. As an example, two elastomeric components of a bore tool can include a first Young's modulus of one elastomeric component where another of the elastomeric components includes a second Young's modulus that differs from the first Young's modulus.

As an example, an elastomeric material that includes carbon-based nanoplatelets can include the carbon-based nanoplatelets at less than approximately 10 percent by weight.

As an example, an elastomeric material can include a fluoroelastomer and carbon-based nanoplatelets. As an example, an elastomeric material can include a nitrile butadiene rubber (e.g., NBR type of elastomer) and carbon-based nanoplatelets. As an example, an elastomeric material can include an ethylene-propylene-diene-monomer rubber (EPDM rubber or EPDM type of elastomer).

As an example, a bore tool can include three elastomeric components where the three elastomeric components include two end elastomeric components and an intermediate elastomeric component. In such an example, one or more of the elastomeric components can include carbon-based nanoplatelets. In such an example, the two end elastomeric components can include a Young's modulus that differs from a Young's modulus of the intermediate elastomeric component.

As an example, a bore tool can include an elastomeric component, disposed about a perimeter surface, that does not include carbon-based nanoplatelets and an elastomeric component that does include carbon-based nanoplatelets.

As an example, carbon-based nanoplatelets of an elastomeric component can include an average maximum platelet dimension less than approximately 50 microns and an average platelet thickness dimension less than approximation 10 nanometers and/or, for example, carbon-based nanoplatelets include an average maximum platelet dimension less than approximately 25 microns and an average platelet thickness dimension less than approximation 5 nanometers.

As an example, a method can include forming an elastomeric component that includes carbon-based nanoplatelets in an elastomeric matrix; fitting the elastomeric component about a perimeter surface of a tool that includes a longitudinal axis; and tripping the tool into a bore in a geologic formation. In such an example, the carbon-based nanoplatelets can include chemically modified carbon-based nanoplatelets. As an example, a method can include compressing an elastomeric component to expand an outer perimeter of the elastomeric component where the elastomeric component includes carbon-based nanoplatelets.

As an example, a bore packer assembly can include a first end elastomeric element; an intermediate elastomeric element; and a second end elastomeric element where at least one of the elastomeric elements includes carbon-based nanoparticles. In such an example, the composition of the end elastomeric elements can differ from the composition of the intermediate elastomeric element.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an application process, an extrusion process, a curing process, a tape forming process, a pumping process, a heating process, etc.

Figure 18:
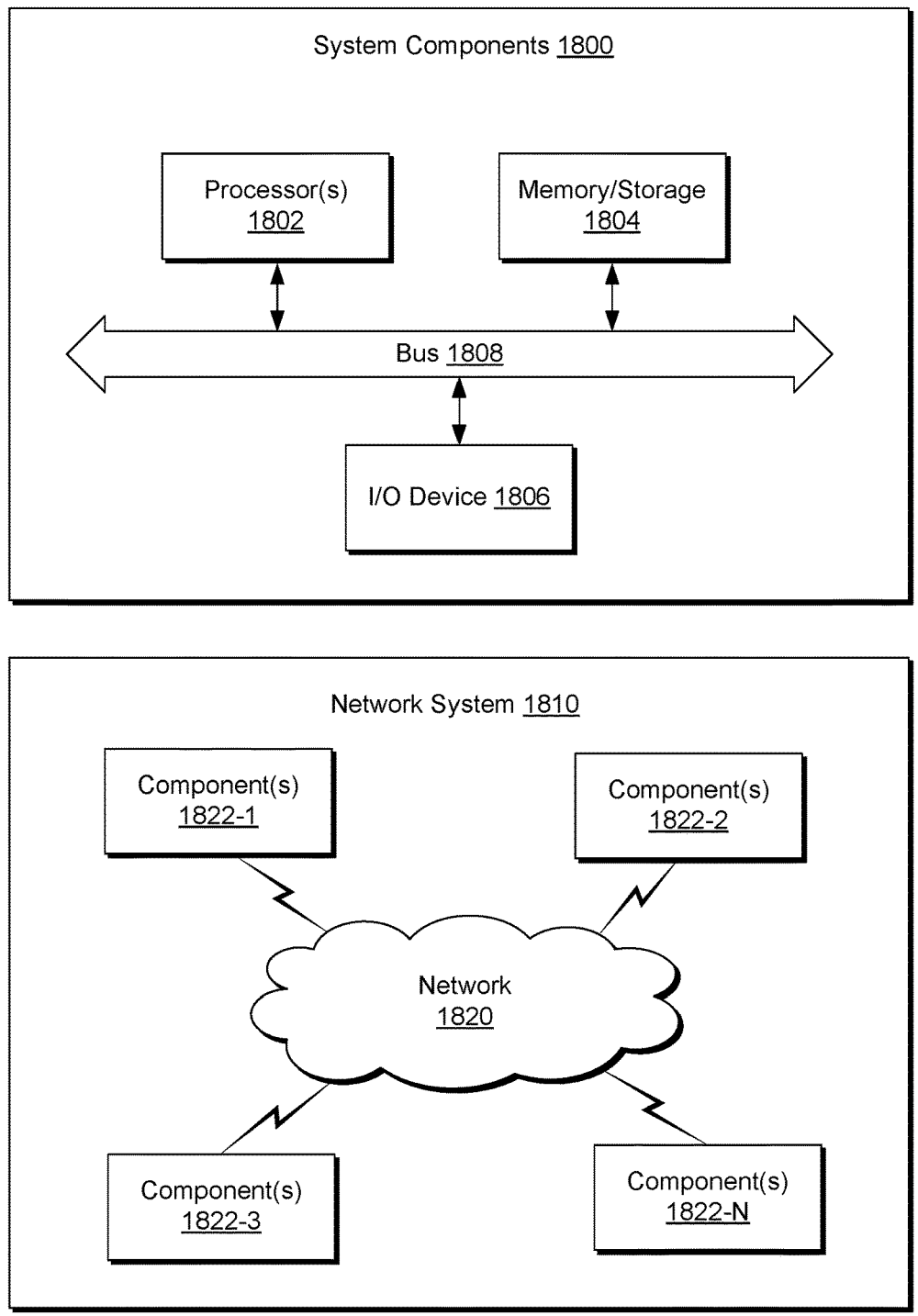
FIG. 18 illustrates example components of a system and a networked system.

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, . . . 1822-N. For example, the components 1822-1 may include the processor(s) 1802 while the component(s) 1822-3 may include memory accessible by the processor(s) 1802. Further, the component(s) 1802-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A bore tool comprising:
   a component that comprises a longitudinal axis and a perimeter surface disposed at one or more radii from the longitudinal axis; and
   an elastomeric component disposed about the perimeter surface wherein the elastomeric component comprises an elastomeric material that comprises carbon-based nanoplatelets,
   wherein the elastomeric material that comprises carbon-based nanoplatelets comprises the carbon-based nanoplatelets at less than approximately 10 percent by weight.

2. The bore tool of claim 1 comprising slips.

3. The bore tool of claim 1 comprising a blowout protector.

4. The bore tool of claim 1 comprising two of the elastomeric components wherein an axial gap exists between the two elastomeric components.

5. The bore tool of claim 1 comprising two of the elastomeric component wherein the two elastomeric components contact each other.

6. The bore tool of claim 5 wherein one of the elastomeric components comprises a first elastomeric material composition and wherein the other of the elastomeric components comprises a second elastomeric material composition that differs from the first elastomeric material composition.

7. The bore tool of claim 5 wherein one of the two elastomeric components comprises a first Young's modulus and wherein the other of the two elastomeric components comprises a second Young's modulus that differs from the first Young's modulus.

8. The bore tool of claim 1 wherein the elastomeric material comprises a fluoroelastomer.

9. The bore tool of claim 1 wherein the elastomeric material comprises a nitrile butadiene rubber.

10. The bore tool of claim 1 comprising three of the elastomeric component wherein the three elastomeric components comprise two end elastomeric components and an intermediate elastomeric component.

11. The bore tool of claim 10 wherein the two end elastomeric components comprise a Young's modulus that differs from a Young's modulus of the intermediate elastomeric component.

12. The bore tool of claim 1 wherein the carbon-based nanoplatelets comprise an average maximum platelet dimension less than approximately 50 microns and an average platelet thickness dimension less than approximation 10 nanometers.

13. The bore tool of claim 1 wherein the carbon-based nanoplatelets comprise an average maximum platelet dimension less than approximately 25 microns and an average platelet thickness dimension less than approximation 5 nanometers.

14. A bore tool comprising:
    a component that comprises a longitudinal axis and a perimeter surface disposed at one or more radii from the longitudinal axis;
    an elastomeric component disposed about the perimeter surface wherein the elastomeric component comprises an elastomeric material that comprises carbon-based nanoplatelets; and
    a bore packer assembly.

15. The bore tool of claim 14 wherein the bore packer assembly comprises a force applicator that is actuatable to apply force to the elastomeric component to at least in part increase a perimeter of the elastomeric component.

16. A bore tool comprising:
    a component that comprises a longitudinal axis and a perimeter surface disposed at one or more radii from the longitudinal axis; and
    an elastomeric component disposed about the perimeter surface wherein the elastomeric component comprises an elastomeric material that comprises carbon-based nanoplatelets,
    wherein the elastomeric material comprises an ethylene-propylene-diene-monomer rubber.

* * * * *